US010033782B2

(12) United States Patent
Morinaga

(10) Patent No.: US 10,033,782 B2
(45) Date of Patent: Jul. 24, 2018

(54) INFORMATION PROCESSING APPARATUS, INFORMATION PROCESSING METHOD, INFORMATION PROCESSING SYSTEM AND PROGRAM THEREOF

(75) Inventor: Takeo Morinaga, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 523 days.

(21) Appl. No.: 12/844,244

(22) Filed: Jul. 27, 2010

(65) Prior Publication Data

US 2011/0029597 A1 Feb. 3, 2011

(30) Foreign Application Priority Data

Aug. 3, 2009 (JP) .................. 2009-180478

(51) Int. Cl.
*G06F 15/16* (2006.01)
*H04N 7/16* (2011.01)
(Continued)

(52) U.S. Cl.
CPC ...... *H04L 65/4092* (2013.01); *H04L 65/4084* (2013.01); *H04L 12/282* (2013.01);
(Continued)

(58) Field of Classification Search
CPC ............. H04L 65/4092; H04L 65/4084; H04L 12/282; H04L 2012/2849; H04N 21/438;
(Continued)

(56) References Cited

U.S. PATENT DOCUMENTS 6,578,070 B1 6/2003 Weaver et al.
7,386,738 B2 * 6/2008 Trappeniers ............ H04L 12/12
713/300

(Continued)

FOREIGN PATENT DOCUMENTS

CN 1288572 A 3/2001
CN 1980388 A 6/2007
(Continued)

OTHER PUBLICATIONS

O'Neill and Barrett, 2004, O'Neill Eileen, Barrett Marianne, "TiVo—the next big thing—DVRs and television advertising models", Montréal, Canada: 6th World Media Economics Conference, HEC Montréal (2004).*
(Continued)

*Primary Examiner* — Taylor Elfervig
(74) *Attorney, Agent, or Firm* — Lerner, David, Littenberg, Krumholz & Mentlik, LLP

(57) ABSTRACT

An information processing apparatus includes: a playback means for requesting an information providing apparatus to transmit a content playback of which has been instructed by a user, receiving the content transmitted in response to the request and playing back the content; and a control means for stopping playback of the content by the playback means as well as transmitting an instruction for continuous playback preparation including a continuous playback position which is a playback stop position of the content to another information processing apparatus when the continuous playback preparation is instructed by the user.

29 Claims, 22 Drawing Sheets

(51) Int. Cl.
*H04L 29/06* (2006.01)
*H04N 21/436* (2011.01)
*H04L 12/28* (2006.01)

(52) U.S. Cl.
CPC ............... *H04L 2012/2849* (2013.01); *H04N 21/43615* (2013.01)

(58) Field of Classification Search
CPC ............ H04N 21/437; H04N 7/17318; H04N 21/43615
USPC .................................. 709/231; 725/138, 139
See application file for complete search history.

(56) References Cited

U.S. PATENT DOCUMENTS

| | | | |
|---|---|---|---|
| 2004/0028228 A1* | 2/2004 | Hamada | G11B 20/00086 380/201 |
| 2004/0104806 A1* | 6/2004 | Yui | G08C 17/02 340/5.74 |
| 2005/0097623 A1* | 5/2005 | Tecot | G11B 27/10 725/136 |
| 2005/0166258 A1* | 7/2005 | Vasilevsky | G11B 27/00 725/138 |
| 2007/0005783 A1 | 1/2007 | Saint-Hillaire et al. | |
| 2007/0053514 A1 | 3/2007 | Imai et al. | |
| 2008/0133715 A1* | 6/2008 | Yoneda | H04L 12/2821 709/219 |
| 2008/0162716 A1 | 7/2008 | Kayanuma et al. | |
| 2009/0193474 A1* | 7/2009 | Stein | H04L 12/2812 725/82 |
| 2009/0304346 A1* | 12/2009 | Prestenback | H04N 5/765 386/278 |

FOREIGN PATENT DOCUMENTS

| | | |
|---|---|---|
| EP | 1545051 A1 | 6/2005 |
| EP | 2023627 A2 | 2/2009 |
| JP | 2005-268834 | 9/2005 |
| JP | 2007-300391 | 11/2007 |
| JP | 2008-085936 | 4/2008 |
| JP | 2008-124700 | 5/2008 |
| JP | 2008124770 A | 5/2008 |
| JP | 2009-065305 | 3/2009 |
| RU | 2189119 C2 | 9/2002 |
| RU | 2304313 C2 | 8/2007 |
| TW | 200719735 A | 5/2007 |
| TW | 200924533 A | 6/2009 |
| WO | 2008155595 A1 | 12/2008 |

OTHER PUBLICATIONS

Michael J. Darnell. 2007. How do people really interact with TV?: naturalistic observations of digital tv and digital video recorder users. Comput. Entertain. 5, 2, pages.*

D. B. Andersen, "A proposed method for creating VCR functions using MPEG streams," Proceedings of the Twelfth International Conference on Data Engineering, New Orleans, LA, 1996, pp. 380-382.*

P. Sumari, M. Merabti and R. Pereira, "Video-on-demand server: strategies for improving performance," In IEE Proceedings—Software, vol. 146, No. 1, pp. 33-37, Feb. 1999.*

Korean Office Action for KR Application No. 20100071904, dated Feb. 15, 2016.

Gallego, et al., "DLNA-Based IPTV Platform", Consumer Communications and Networking Conference Publication, Jan. 2009, pp. 1-5.

International Electrotechnical Commission, Digital Living Network Alliance (DLNA) Home Networked Device Interoperability Guidelines—Part 1, Architecture and Protocols, Aug. 2007, 13 pages, IEC 62481-1, Edition 1.0.

EP Office Action for EP Application No. 10170960.8, dated Apr. 18, 2018.

* cited by examiner

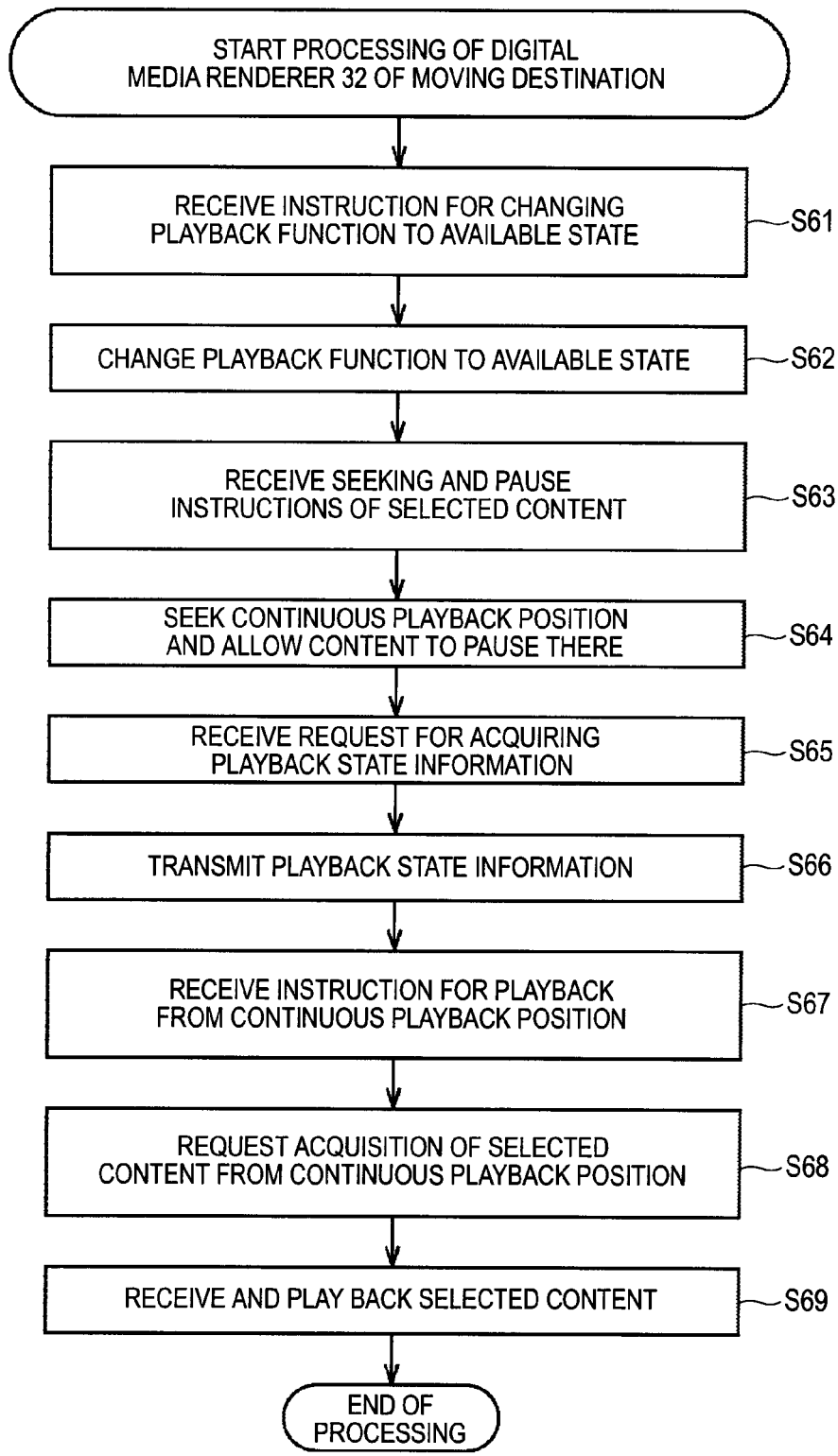

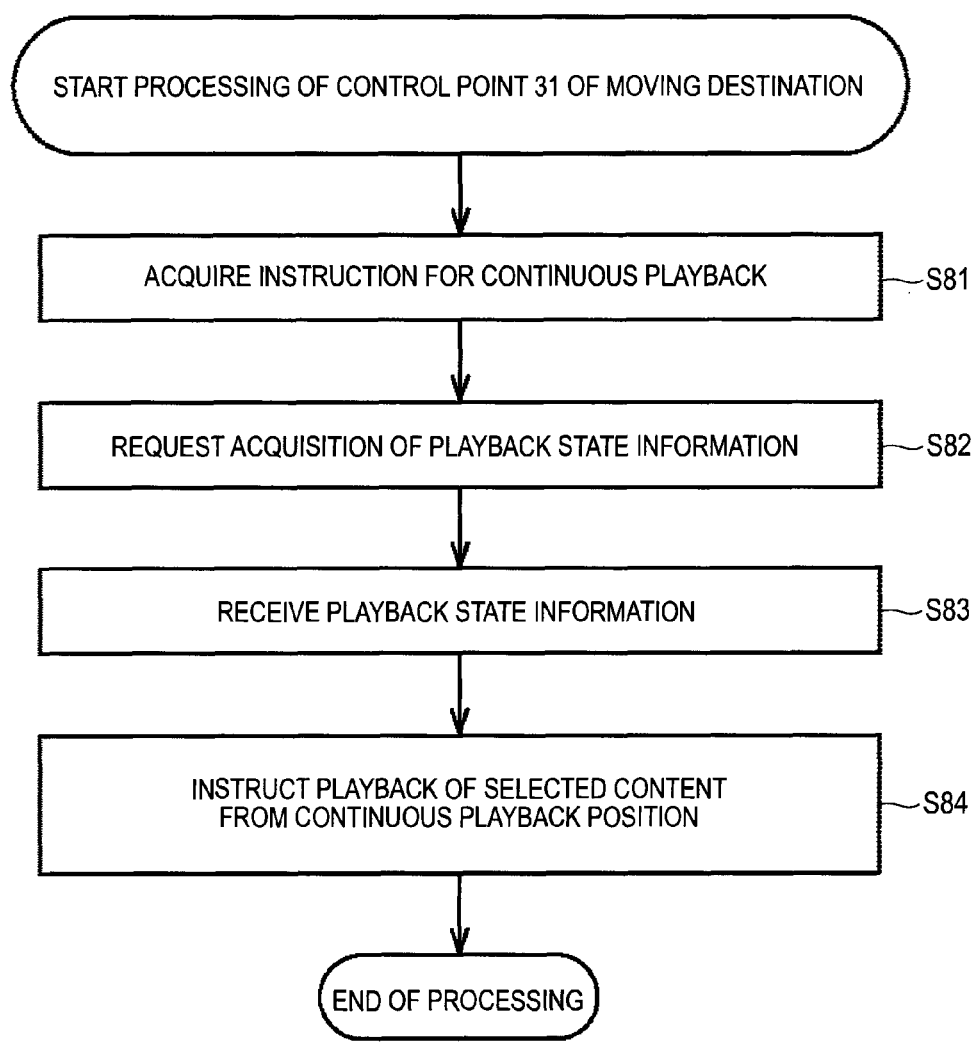

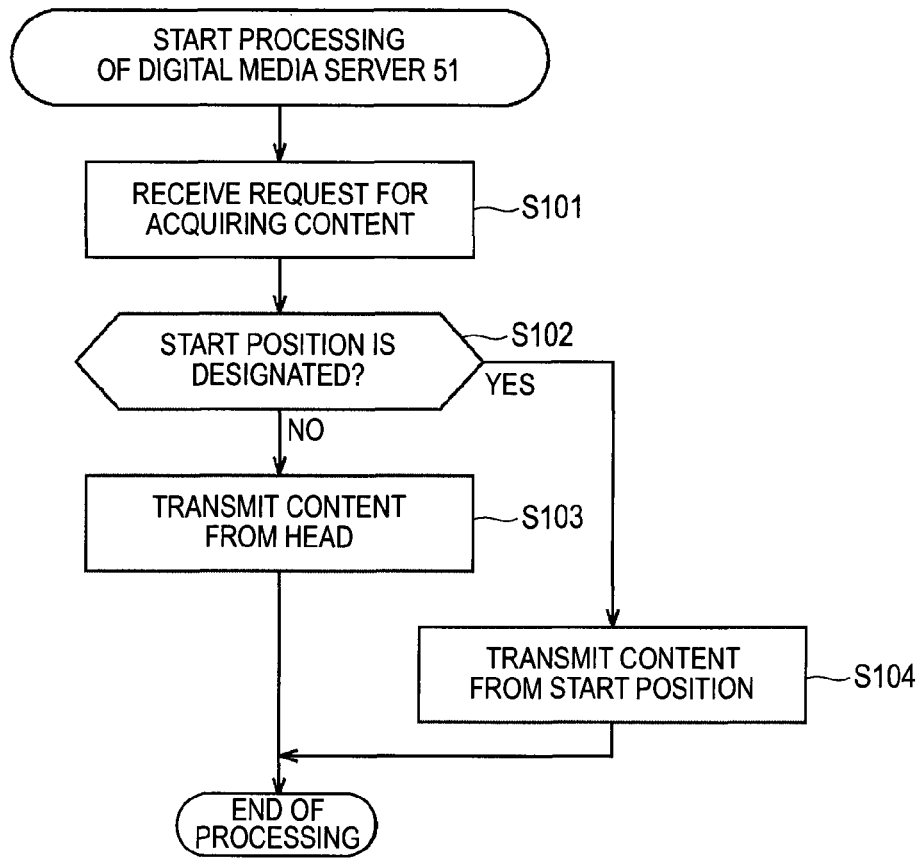
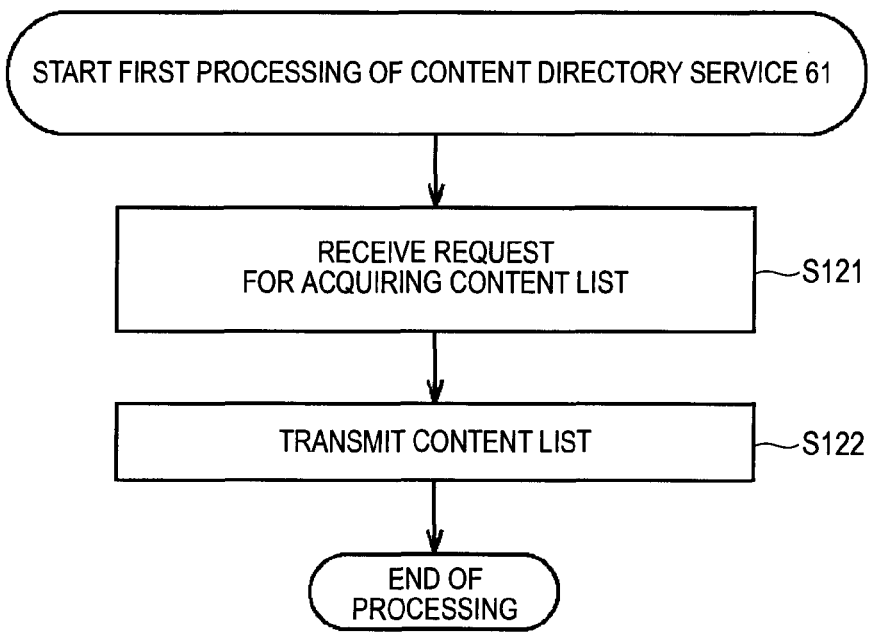

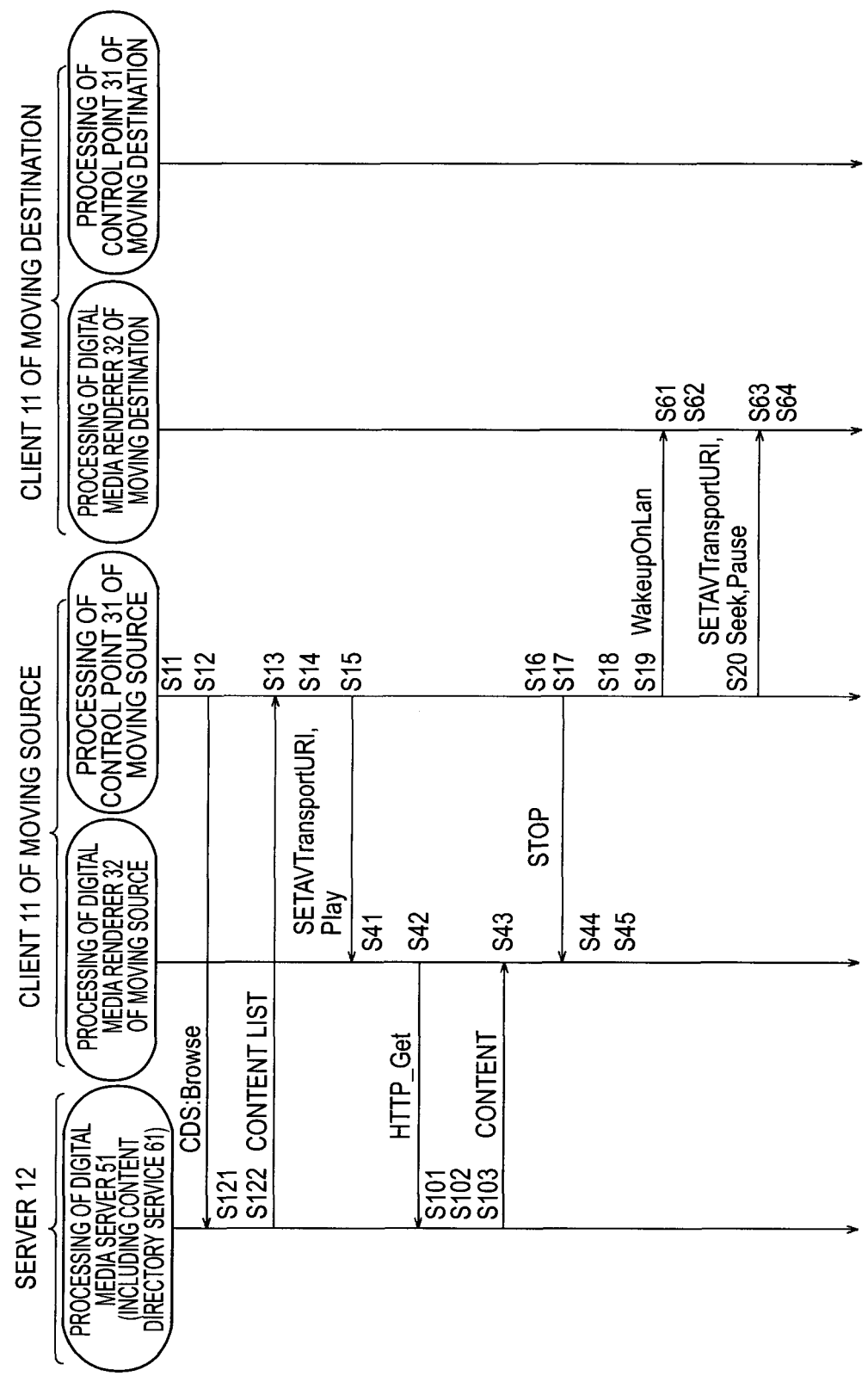

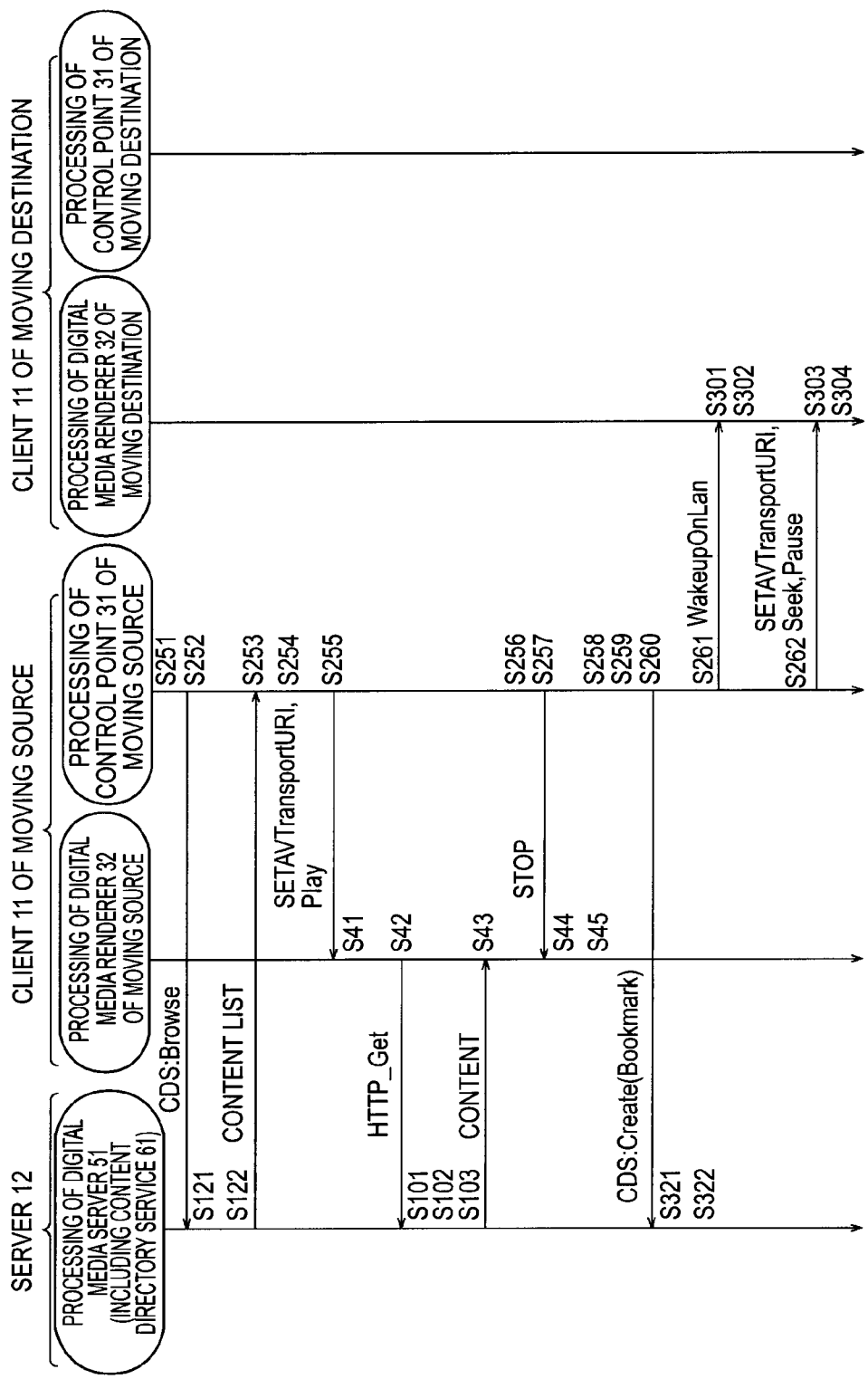

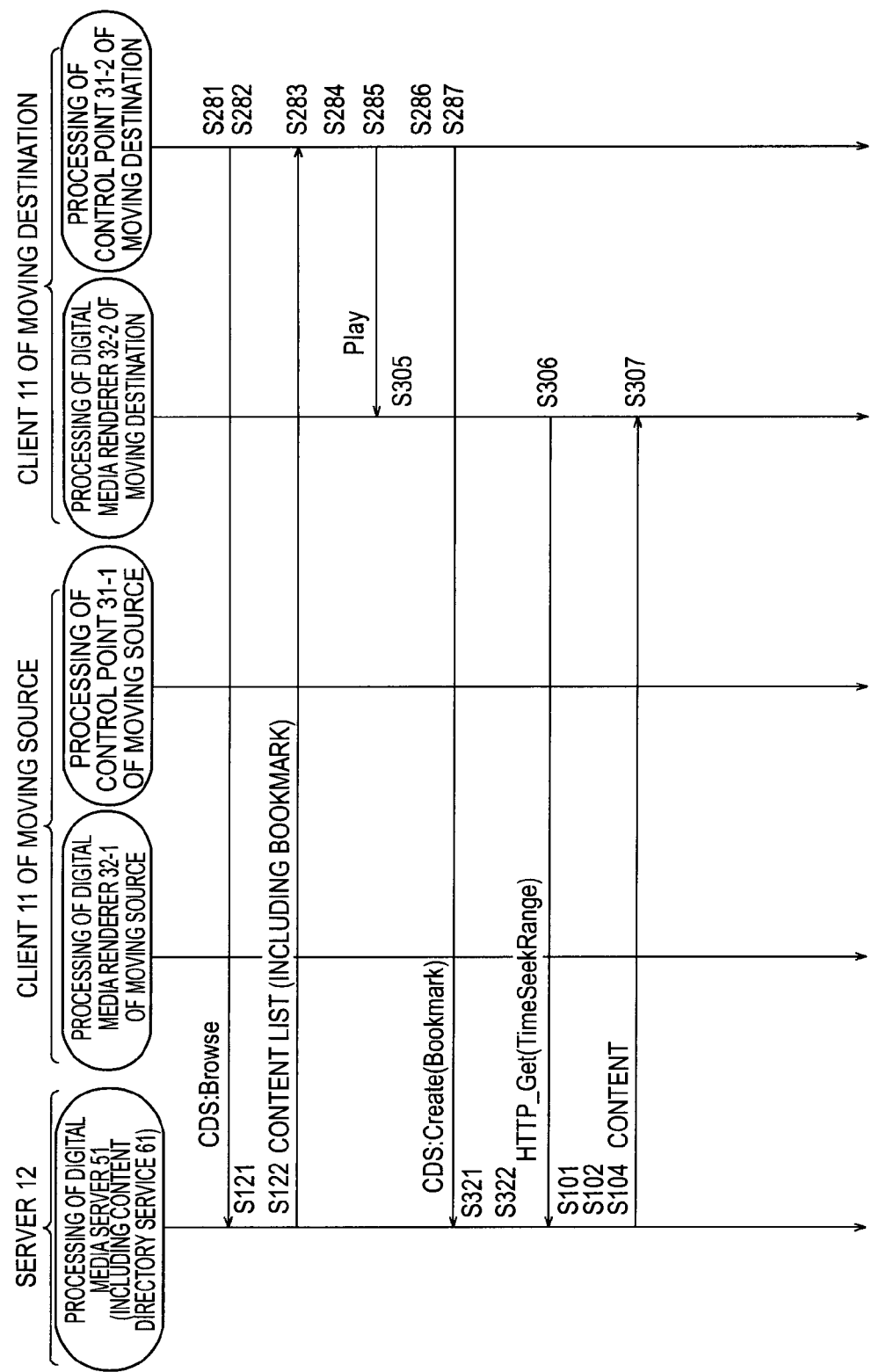

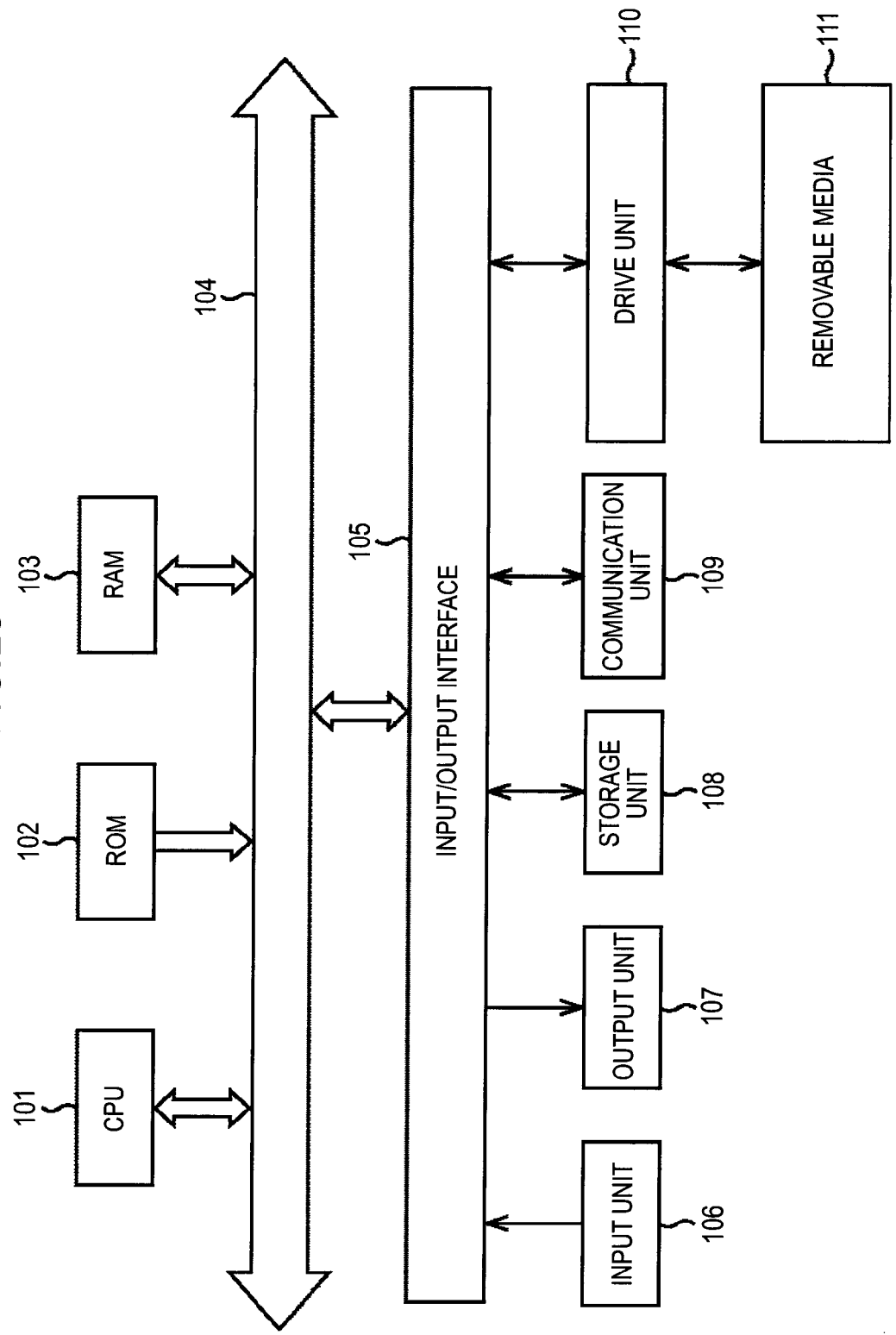

INFORMATION PROCESSING APPARATUS, INFORMATION PROCESSING METHOD, INFORMATION PROCESSING SYSTEM AND PROGRAM THEREOF

BACKGROUND OF THE INVENTION

1. Field of the Invention

The present information relates to an information processing apparatus, an information processing method, an information processing system and a program thereof, and particularly relates to an information processing apparatus, an information processing method, an information processing system and a program thereof capable of performing continuous playback more smoothly.

2. Description of the Related Art

An information processing system using a technique of mutually connecting consumer electronics such as DLNA (Digital Living Network Alliance) is becoming popular.

In the information processing system, the same content on a server can be played back in cooperation with different client apparatus. For example, the same content on the server is played back by a certain apparatus (namely, a moving source apparatus) and played back by another apparatus (namely, a moving destination apparatus) continuously from the middle of the content, that is, continuous playback can be realized.

As a common method of the continuous playback, for example, the following method exists. That is, a user stops playback at a moving source and moves to a moving destination, then, operates the moving destination apparatus to search the content during playback from contents on the server. The moving destination apparatus acquires the searched content from the server and plays back the content from a position in the middle of the content.

As another method of the continuous playback, for example, the following method exists. That is, the user acquires information of a content and a playback position of the content during playback in an information receiving terminal device as the moving source apparatus through a portable terminal as the moving destination apparatus. After that, the user operates the portable terminal to transmit the playback position of the content until then to the content delivery server, then, the user acquires the content from the playback position through the content delivery server and plays back the content (for example, refer to JP-A-2009-65305 (Patent Document 1).

SUMMARY OF THE INVENTION

However, it is necessary that the user searches the content from the moving destination apparatus and performs operation for acquiring the playback position until then, therefore, it took time to view the content after the user operation in the method of the continuous playback in related art. That is, it was difficult to perform the continuous playback of contents smoothly.

In view of the above, it is desirable to perform continuous playback more smoothly.

According to an embodiment of the invention, there is provided an information processing apparatus including a playback means for requesting an information providing apparatus to transmit a content playback of which has been instructed by a user, receiving the content transmitted in response to the request and playing back the content and a control means for stopping playback of the content by the playback means as well as transmitting an instruction for continuous playback preparation including a continuous playback position which is a playback stop position of the content to another information processing apparatus when the continuous playback preparation is instructed by the user.

The control means can transmit information indicating that the content is during continuous playback preparation and given information including the continuous playback position to the information providing apparatus and can register these information therein when the continuous playback preparation is instructed by the user.

The control means can transmit the instruction for continuous playback preparation to other plural information processing apparatus.

According to another embodiment of the invention, there is provided an information processing method of an information processing apparatus having a playback means and a control means, which includes the steps of requesting an information providing apparatus to transmit a content playback of which has been instructed by a user, receiving the content transmitted in response to the request and playing back the content by the playback means and stopping playback of the content by the playback means as well as transmitting an instruction for continuous playback preparation including a continuous playback position which is a playback stop position of the content to another information processing apparatus by the control means when the continuous playback preparation is instructed by the user.

According to still another embodiment of the invention, there is provided a program for allowing a computer to function as a playback means for requesting an information providing apparatus to transmit a content playback of which has been instructed by a user, receiving the content transmitted in response to the request and playing back the content and a control means for stopping playback of the content by the playback means as well as transmitting an instruction for continuous playback preparation including a continuous playback position which is a playback stop position of the content to another information processing apparatus when the continuous playback preparation is instructed by the user.

According to yet another embodiment of the invention, there is provided an information processing apparatus including a playback means for making preparation for playback from a continuous playback position of a content when an instruction for continuous playback preparation including the continuous playback position concerning the content on an information providing apparatus is transmitted from another information processing apparatus as an instruction source and a control means for controlling the playback means to play back the content from the continuous playback position when continuous playback is instructed by the user.

The instruction for continuous playback preparation is transmitted also to other information processing apparatus other than the instruction source, and the control means can request other information processing apparatus other than the instruction source to change a playback function thereof into a sleep state when continuous playback is instructed by the user.

The control means can acquire the content during continuous playback preparation and the continuous playback position from the playback means when continuous playback is instructed by the user and can control the playback means to play back the content from the continuous playback position based on the position.

Information indicating that the content is during continuous playback preparation and given information including the continuous playback position are registered in the information providing apparatus, and the control means can acquire the given information registered in the information providing apparatus when continuous playback is instructed by the user and can control the playback means to play back the content from the continuous playback position based on the information.

According to still yet another embodiment of the invention, there is provided an information processing method of an information processing apparatus having a playback means and a control means, which includes the steps of making preparation for playback from a continuous playback position of a content by the playback means when an instruction for continuous playback preparation including the continuous playback position concerning the content on an information providing apparatus is transmitted from another information processing apparatus as an instruction source and controlling the playback means to play back the content from the continuous playback position by the control means when continuous playback is instructed by the user.

According to further another embodiment of the invention, there is provided a program allowing a computer to function as a playback means for making preparation for playback from a continuous playback position of a content when an instruction for continuous playback preparation including the continuous playback position concerning the content on an information providing apparatus is transmitted from another information processing apparatus as an instruction source and a control means for controlling the playback means to play back the content from the continuous playback position when continuous playback is instructed by the user.

According to still further another embodiment of the invention, there is provided an information processing system including an information providing apparatus, a first information processing apparatus and a second information processing apparatus, in which the information providing apparatus stores contents, the first information processing apparatus includes a first playback means for requesting the information providing apparatus to transmit a content playback of which has been instructed by a user, receiving the content transmitted in response to the request and playing back the content, and a first control means for stopping playback of the content by the first playback means as well as transmitting an instruction for continuous playback preparation including a continuous playback position which is a playback stop position of the selected content to the second information processing apparatus when the preparation for continuous playback preparation is instructed by the user, the second information processing apparatus includes a second playback means for receiving the instruction for continuous playback preparation transmitted from the first information processing apparatus and making preparation for playback from the continuous playback position of the content, and a second control means for controlling the second playback means to play back the content from the continuous playback position when continuous playback is instructed by the user.

According to yet further another embodiment of the invention, there is provided an information processing method of an information processing system including an information providing apparatus, a first information processing apparatus having a first playback means and a first control means as well as a second information processing apparatus having a second playback means and a second control means, which includes the steps of storing contents in the information providing apparatus, in the first information apparatus, requesting the information providing apparatus to transmit a content playback of which has been instructed by a user, receiving the content transmitted in response to the request and playing back the content by the first playback means, and stopping playback of the content by the first playback means as well as transmitting an instruction for continuous playback preparation including a continuous playback position which is a playback stop position of the selected content to the second information processing apparatus by the first control means when the continuous playback preparation is instructed by the user, in the second information processing apparatus, receiving the instruction for continuous playback preparation transmitted from the first information processing apparatus and making preparation for playback from the continuous playback position of the content by the second playback means, and controlling the second playback means to play back the content from the continuous playback position by the second control means when continuous playback is instructed by the user.

According to the embodiment of the invention, the information providing apparatus is requested to transmit a content playback of which has been instructed by a user, the content transmitted in response to the request is received and played back and playback of the content is stopped as well as the instruction for continuous playback preparation including the continuous playback position which is the playback stop position of the content is transmitted to another information processing apparatus when the continuous playback preparation is instructed by the user.

According to the embodiment of the invention, the preparation for playback from a continuous playback position of the content is made when the instruction for continuous playback preparation including the continuous playback position concerning the content on the information providing apparatus is transmitted from another information processing apparatus as the instruction source and the playback is controlled so that the content is played back from the continuous playback position when continuous playback is instructed by the user.

According to the embodiment, in the information processing system including an information providing apparatus, a first information processing apparatus, and a second information processing apparatus, in which contents are stored in the information providing apparatus, in the first information processing apparatus, the information providing apparatus is requested to transmit a content playback of which has been instructed by a user, the content transmitted in response to the request is received and played back, and playback of the content is stopped as well as the instruction for continuous playback preparation including the continuous playback position which is the playback stop position of the selected content is transmitted to the second information processing apparatus when the preparation for continuous playback preparation is instructed by the user, in the second information processing apparatus, the instruction for continuous playback preparation transmitted from the first information processing apparatus is received and preparation for playback from the continuous playback position of the content is made, and the playback is controlled so that the content is played back from the continuous playback position when continuous playback is instructed by the user.

According to the embodiments of the invention, continuous playback can be performed more smoothly.

BRIEF DESCRIPTION OF THE DRAWINGS

FIG. 6 is a flowchart for explaining a processing example of a digital media renderer of a moving destination;

FIG. 7 is a flowchart for explaining a processing example of a control point of the moving destination;

FIG. 8 is a flowchart for explaining a processing example of a digital media server;

FIG. 9 is a flowchart for explaining a processing example of a content directory service;

FIG. 10 is a flowchart for explaining a processing example among respective functional blocks;

FIG. 21 is a flowchart for explaining a processing example among respective functional blocks;

FIG. 22 is a flowchart for explaining a processing example among respective functional blocks; and FIG. 23 is a block diagram showing a configuration example of hardware of a computer to which the embodiment of the invention is applied.

DESCRIPTION OF THE PREFERRED EMBODIMENTS

Hereinafter, two embodiments as embodiments of an information processing system to which the invention is applied (referred to as a first embodiment and a second embodiment in the following description) will be explained with reference to the drawings in the following order.

1. First Embodiment (Example in which a moving destination apparatus acquires information used for the continuous playback from a playback means of the apparatus itself)

2. Second Embodiment (Example in which the moving destination apparatus acquires information used for the continuous playback from a server)

<1. First Embodiment>

[Configuration Example of an Information Processing System to which the Invention is Applied]

Figure 1:
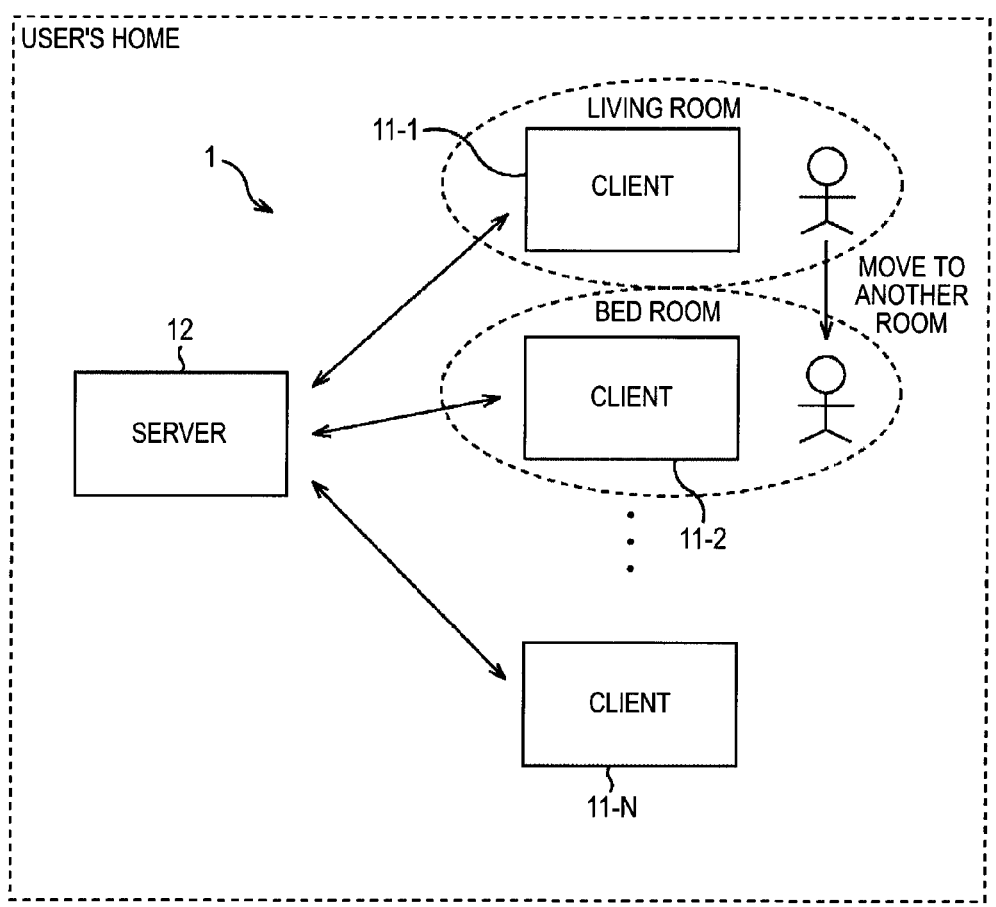
FIG. 1 is a block diagram showing a configuration example of an information processing system according to a first embodiment to which the invention is applied.

FIG. 1 is a view showing a configuration example of an information processing system according to a first embodiment to which the invention is applied.

An information processing system 1 is constructed, for example, in a user's home.

The information processing system 1 includes n-sets of (N is an integer of 1 or more) clients 11-1 to 11-N and a server 12. The respective clients 11-1 to 11-N and the server 12 can communicate with one another with wireless or wired connection. The clients 11-1 to 11-N can also performed communication with one another.

In the first embodiment and the later-described second embodiment, the clients 11-1 to 11-N and the server 12 are apparatus physically different from one other. Additionally, a configuration of apparatus in which the server 12 is united with one of the clients 11-1 to 11-N can be also applied.

When it is not necessary that the clients 11-1 to 11-N are discriminated from one another, they are appropriately referred to as the client 11 in the following description.

The client 11 includes apparatus having a function of playing back contents of video, audio and the like in a TV (Television) receiver, a video recorder, an audio device and so on. The client 11 requests the server 12 to deliver (transmit) a content, receives the content transmitted from the server 12 in response to the request and plays back the content.

The server 12 includes, for example, a PC (Personal Computer) and so on. The server 12 stores contents and transmits a content to a request source in response to the request from the client 11.

In the example of FIG. 1, the server 12 is set at a study, the client 11-1 is set at a living room and the client 11-2 is set at a bed room respectively in the user's home. Assume that continuous playback is performed by using the client 11-1 and the client 11-2. In the example, rooms where the clients 11-3 (not shown) to 11-N are set are not particularly designated.

A use case of continuous playback using the client 11-1 and the client 11-2 is, for example, as follows. That is, the user views the content to the middle thereof by using the client 11-1 at the living room, and next, he/she moves to the bed room, where he/she views the content from a position of the content viewed at the living room continuously by using the client 11-2.

In the following description, the client 11-1 positioned at a moving source is referred to as a client 11 of the moving source and the client 11-2 positioned at a moving destination is referred to as a client 11 of the moving destination according to need.

In the embodiment of the invention, preparation for continuous playback by the client 11 of the moving destination is made not by user operation with respect to the client 11 of the moving destination but made by user operation with respect to the client 11 of the moving source as a trigger. A method of the continuous playback in which preparation for continuous playback of the client 11 of the moving destination is made by user operation with respect to the client 11 of the moving source as a trigger is called a method of moving-source trigger continuous playback.

In the method of moving-source trigger continuous playback, when any user operation is performed with respect to the client 11 of the moving source during playback of the content, the client 11 of the moving source performs the following processing. That is, the client 11 of the moving source stops playback of the content at the point as well as instructs the client 11 of the moving destination to make preparation for the continuous playback of the content.

When the client 11 of the moving destination receives the instruction for continuous playback preparation, the client 11 of the moving destination starts preparation for continuous playback in response to the instruction. That is, the client 11 of the moving destination changes a mode of the playback function of the apparatus itself to an available state, seeking the position of the content played back by the client of the moving source. According to the operation, the preparation for continuous playback by the client 11 of the moving destination is completed. After that, when the user moves to the moving destination and the continuous playback is instructed with respect to the client 11 of the moving destination by the user, the client 11 of the moving destination acquires the content from the position where the playback has been stopped from the server 12, which has been already sought, playing back the content from the position where the playback has been stopped.

As described above, in the method of moving-source trigger continuous playback, the preparation for continuous playback at the client 11 of the moving destination is started by user operation with respect to the client 11 of the moving source as the trigger. Accordingly, the preparation for continuous playback can be completed by using a period of time during which the user moves to another room. Therefore, the preparation for continuous playback can also be completed before user operation with respect to the client 11 of the moving destination. Accordingly, the content can be viewed just after the user operation with respect to the client 11 of the moving destination, therefore, the continuous playback can be performed more smoothly.

Also in the method of moving-source trigger continuous playback, complicated work for the preparation for continuous playback by the user is not necessary, therefore, operationality is remarkably improved. As a result, it is also possible to further encourage broad use of DLNA devices.

The information processing system 1 to which the method of moving-source trigger continuous playback described above is applied will be explained with reference to FIG. 2 and FIG. 3.

In the information processing system 1, arbitrary two clients 11 of the clients 11-1 to 11-N are connected to each other with wireless or wired connection. Accordingly, control processing such as the instruction for continuous playback preparation is possible between the arbitrary two clients 11.

In the first embodiment and the later-described second embodiment, as a transmission format of contents used between the client 11 and the server 12, for example, an audio visual stream (referred to as an AV stream in the following description) is applied. However, the transmission format of contents is not limited to the AV stream.

Also in the first embodiment and the later-described second embodiment, the client 11 and the server 12 having the following configurations are applied on the assumption that they are DLNA models. That is, each of the client 11 and the server 12 includes one or more functional blocks operating in the same apparatus independently.

[Configuration of the Client 11]

Figure 2:
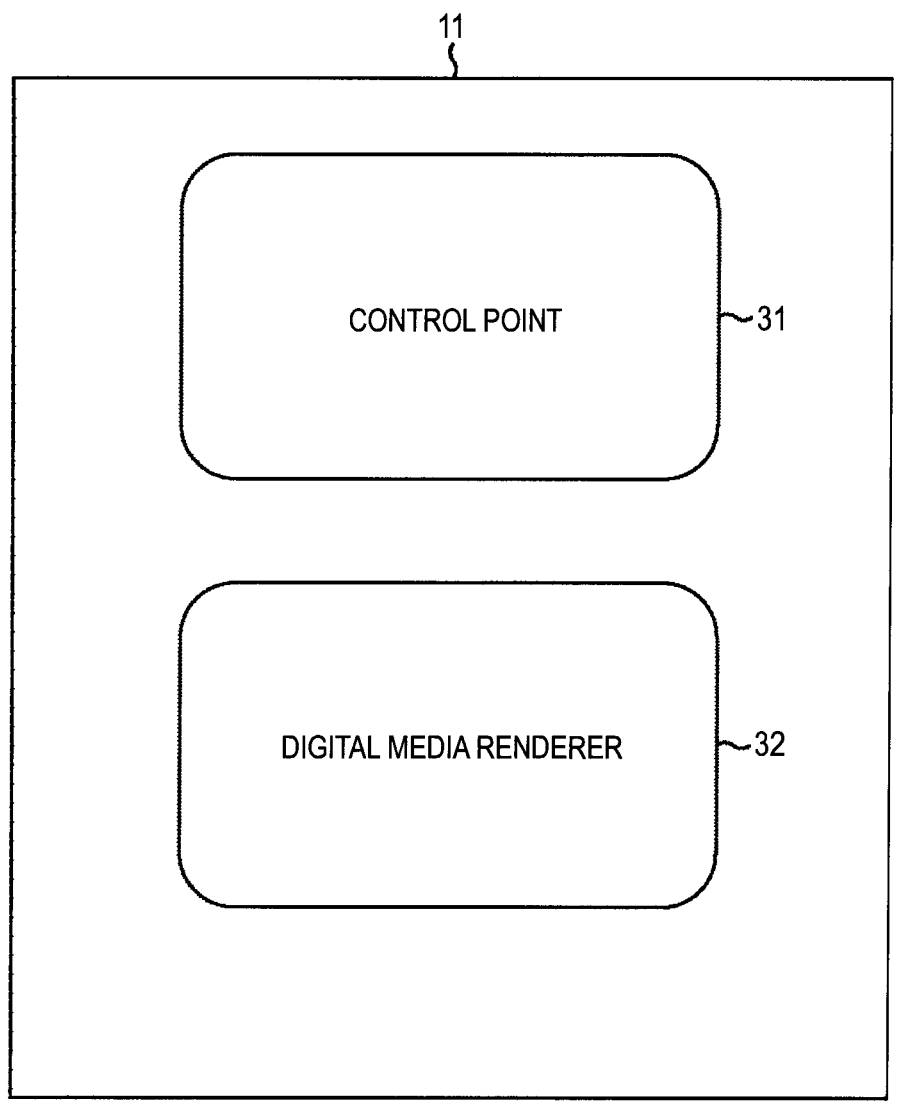
FIG. 2 is a block diagram showing a configuration example of functional blocks of a client of FIG. 1.

FIG. 2 is a view showing a configuration example of the client 11.

The client 11 includes, for example, a control point 31 (referred to as a CP 31 in the following description) and a digital media renderer 32 (referred to as a DMR 32 in the following description).

The CP31 performs control of the DMR 32 based on an instruction by the user. The DMR 32 requests the server 12 to transmit a content playback of which has been instructed by the user, receives and plays back the content transmitted in response to the request.

The DMR 32 has not only the function of playing back contents but also a function of controlling the mode of the playback function to the available state as well as to a sleep state. In the available state, not only the communication but also playback of contents is possible. In the sleep state, power consumption is suppressed and the playback of contents is unavailable, however, communication with other clients 11 as well as the server 12 can be performed.

The CP 31 and the DMR 32 included in the client 11-$k$ (1≤$k$≤N) are referred to as a CP31-$k$ and a DMR32-$k$, respectively.

[Configuration of the Server 12]

Figure 3:
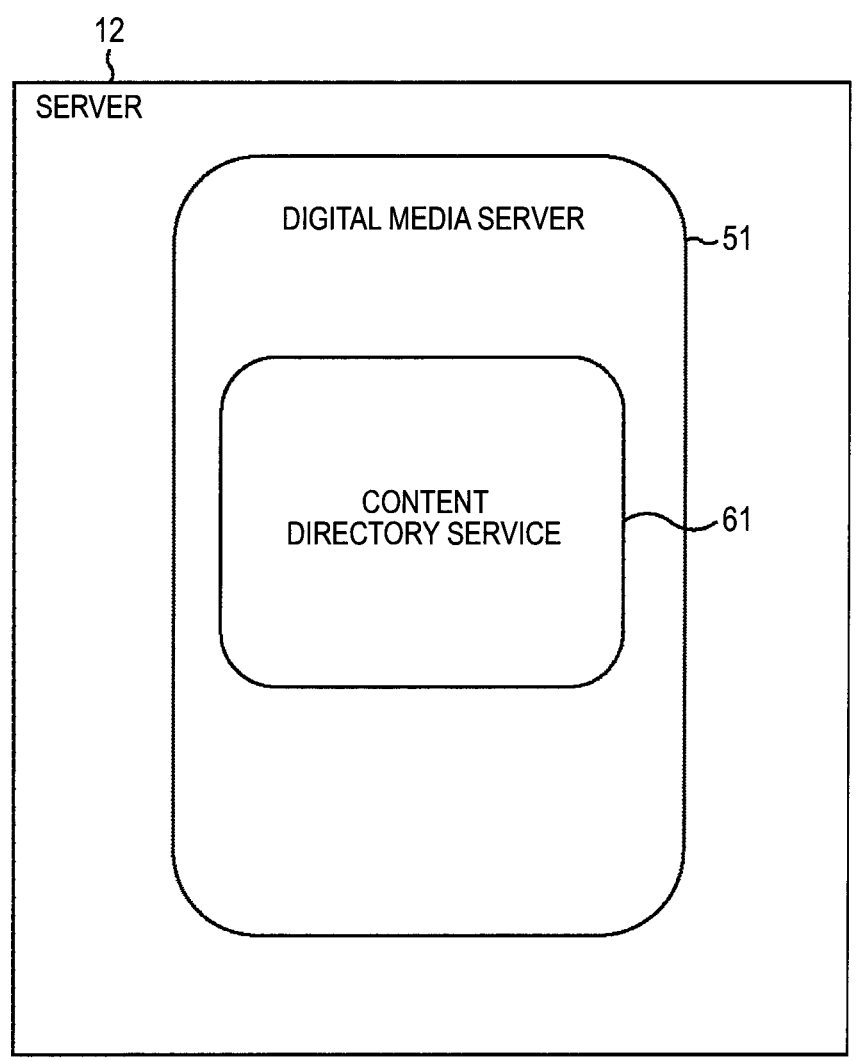
FIG. 3 is a block diagram showing a configuration example of functional blocks of a server of FIG. 1.

FIG. 3 is a view showing a configuration example of functional blocks of the server 12.

The server 12 includes, for example, a digital media server 51 (referred to as a DMS 51 in the following description). The DMS 51 further includes a content directory service 61 (referred to as a CDS 61 in the following description).

The DMS 51 has a server function of transmitting contents on the server 12 in response to the request from the client 11. The CDS 61 has a server function of transmitting a list on which content names are written (referred to as a content list) and actual contents corresponding to the list in response to the request from the client 11.

The client 11 of the moving source and the client 11 of the moving destination and the server 12 which are configured as described above perform processing in cooperation with one another in the method of moving-source trigger continuous playback.

[Processing Example of the CP31 of the Moving Source]

Processing of the client 11 of the moving source in the method of moving-source trigger continuous playback will be explained with reference to FIG. 4 and FIG. 5.

In the following description, a CP31-1 of the moving source (referred to as the CP31 of the moving source in the following description) and a DMR32-1 of the moving source (referred to as the DMR32 of the moving source in the following description) will be respectively main bodies of processing instead of the client 11-1 of the moving source.

Figure 4:
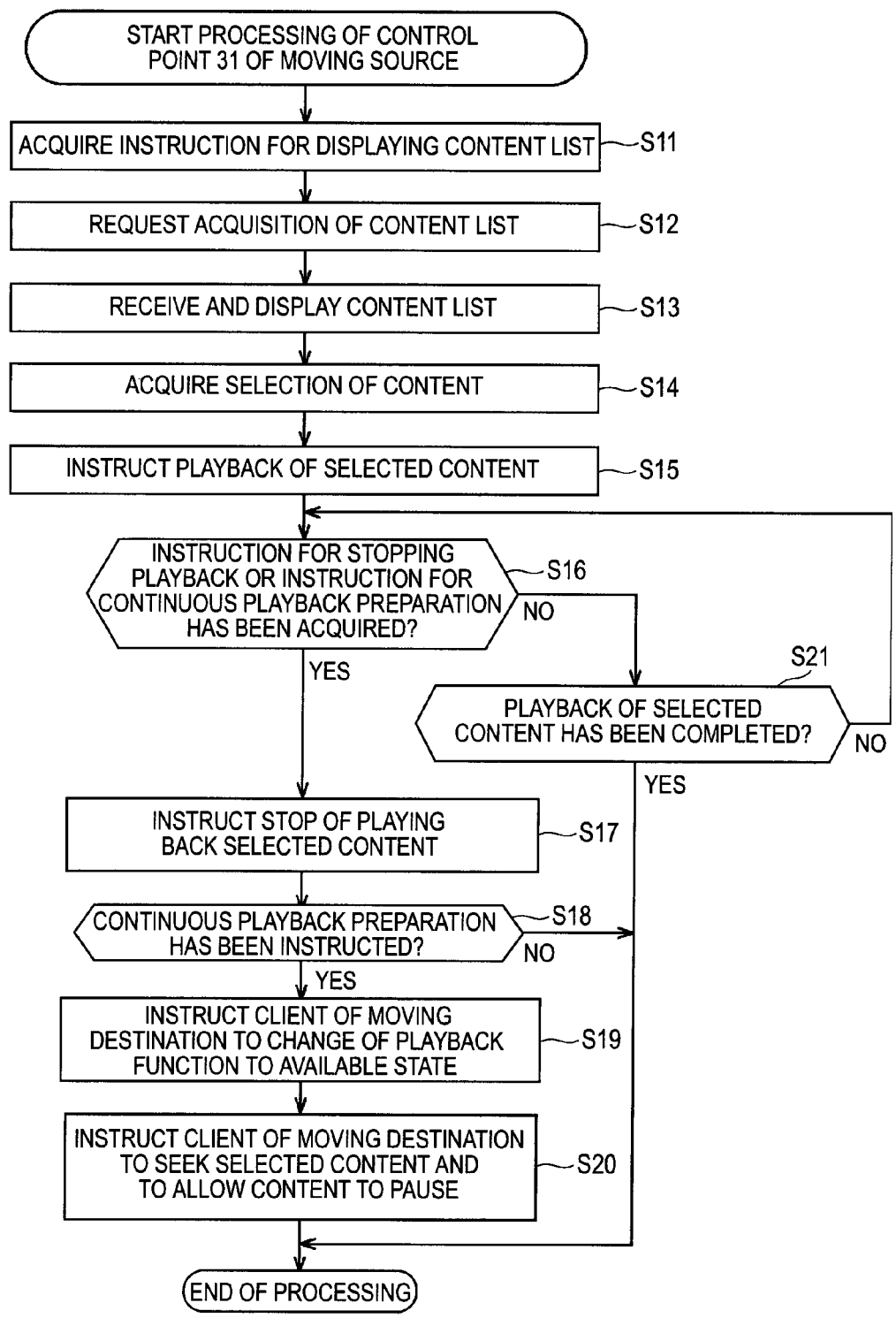
FIG. 4 is a flowchart for explaining a processing example of a control point of a moving source.

FIG. 4 is a flowchart for explaining a processing example of the CP31 of the client 11 of the moving source.

The processing of the CP31 of the moving source is started when display of the content list is instructed with respect to the client 11 of the moving source by the user.

For example, the user instructs the client 11 of the moving source to display the content list by using a remote controller and so on. When the display of the content list is instructed, the CP 31 of the moving source acquires an instruction for displaying the content list in Step S11. The CP 31 of the moving source requests the server 12 to supply the content list in Step S12. Specifically, the CP 31 of the moving source issues, for example, a command "CDS: Browse" for requesting the supply of the content list and transmits the command to the server 12.

As described later with reference to FIG. 9, the CDS 61 performs the following processing when receiving the request for transmitting the content list from the client 11 of the moving source. That is, the CDS 61 transmits the content list stored in the server 12 to the client 11 of the moving source which is the request source in response to the request for transmitting the content list (Steps S121, S122 of FIG. 9).

In Step S13, the CP 31 of the moving source receives the content list from the server 12 and displays respective contents in the content list on a not-shown display screen so as to be selected. According to this, the user can select a content of a desired name in the displayed content list.

In Step S14, the CP 31 of the moving source acquires the selection of the content by user in Step S14. In this example, the selected content is assumed to be a content #1 in k-pieces of contents #1 to "k" ("k" is an integer of 2 or more) on the server 12.

In Step S15, the CP 31 of the moving source instructs the DMR 32 to playback the content #1 as the selected content. Specifically, the CP 31 of the moving source issues, for example, a command "SETAVTransportURI" for requesting setting of a place of acquiring the selected content (specified by a URI (Uniform Resource Identifier) and transmits the command to the DMR 32 of the moving source. In this example, the place of acquiring the selected content is a specific place on the server 12. The CP 31 of the moving source further issues a command "Play" for instructing playback of the selected content and transmits the command to the DMR 32 of the moving source.

As described later with reference to FIG. 5, the DMR 32 of the moving source acquires and plays back the selected content from the server 12 when receiving the instruction for playing back the selected content (Steps S41 to S43 of FIG. 5).

In Step S16, the CP 31 of the moving source determines whether the instruction for stopping playback or the instruction for continuous playback preparation has been acquired or not.

The user operates, for example, a not-shown continuous playback preparation button when giving instruction for continuous playback preparation. The user operates, for example, a not-shown playback stop button when instructing the end of playback.

For example, during a period in which neither the playback stop button nor the continuous playback preparation button of the client 11 of the moving source is operated by the user, the determination is negative in Step S16, and process proceeds to Step S21. Processing after Step S21 will be described later.

On the other hand, for example, either of the playback stop button and the continuous playback preparation button is operated by the user, determination is affirmative in Step S16, and the process proceeds to Step S17.

When the user operates the continuous playback preparation button and gives instruction for continuous playback preparation, the user moves from the living room as the moving source to the bed room as the moving destination after the user operates the continuous playback preparation button. The user may or may not operate the client 11 of the moving source to change the playback function from the available state to the sleep state before moving from the room.

In Step S17, the CP 31 of the moving source instructs the DMR 32 of the moving source to stop playback of the selected content. Specifically, the CP 31 of the moving source issues, for example, a command "Stop" for instructing the stop of playing back the selected content and transmits the command to the DMR 32 of the moving source.

As described later with reference to FIG. 5, the DMR 32 of the moving source receives the instruction for stopping playback of the selected content from the CP 31 of the moving source and stops the playback of the selected content in response to the instruction (Steps S44, S45 of FIG. 5). A position where the playback has been stopped is a position where continuous playback is started in the client 11 of the moving destination. Accordingly, the position is written as a continuous playback position PO in the following description.

In Step S18, the CP 31 of the moving source determines whether the instruction by the user determined in Step S16 is the instruction for continuous playback preparation or not.

For example, when the button operated by the user is the playback stop button, the determination is negative in Step S18, and the processing of the CP 31 of the moving source ends.

On the other hand, for example, when the button operated by the user is the continuous playback preparation button, the determination is affirmative in Step S18, and the process proceeds to Step S19. In Step S19, the CP 31 of the moving source instructs the DMR 32 of the moving destination to change of the playback function to the available state. Specifically, the CP 31 of the moving source issues a command "WakeupOnLan" for instructing the change of the playback function to the available state and transmits the command to the client 11 of the moving destination.

In the case where three or more clients 11 (that is, in the case of N≥3), for example, the client 11-1 to the client 11-N may be displayed on a menu screen so as to be selective for allowing the user to select the client 11 of the moving destination. In this case, the client 11 selected from the menu screen will be the client 11 of the moving destination.

As described later with reference to FIG. 6, the client 11 of the moving destination changes the playback function of the apparatus itself to the available state in response to the instruction when receiving the instruction for changing the playback function to the available state (Steps S61, S62 of FIG. 6).

In the first embodiment and the later-described second embodiment, the dedicated continuous playback button is provided as a button for instructing the change of the playback function to the available state, however, it is also preferable that, for example, a pause button normally provided at playback devices and other types of buttons can be used instead of the dedicated continuous playback button. In this case, for example, when the pause button is operated by the user, playback of the selected content is temporarily stopped at the client 11 of the moving source as well as the instruction for continuous playback preparation is transmitted to the client 11 of the moving destination.

In Step S20, the CP 31 of the moving source instructs the client 11 of the moving destination to seek the selected content and to allow the content to pause. In the seeking instruction includes the continuous playback position PO as the seeking position. Specifically, the CP 31 of the moving source issues, for example, the command "SETAVTransportURI" for requesting setting of the place of acquiring the selected content and transmits the command to the client 11 of the moving destination. The CP 31 of the moving source further issues a command "Seek" for seeking the continuous playback position PO as the seeking position of the selected content and a command "Pause" for allowing the selected content to pause and transmits the commands to the client 11 of the moving destination. Then, the processing of the CP 31 of the moving source ends.

As described later with reference to FIG. 6, the client 11 of the moving destination receives the seeking and pause instructions from the CP 31 of the moving source and seeks the continuous playback position PO of the selected contents and allows the content to pause at the position in response to the instructions (Steps S63, S64 of FIG. 6). Accordingly, the continuous playback preparation in the client 11 of the moving destination is completed. The above pause operation is not always necessary, however, an effect of allowing the user to recognize the completion of the continuous playback preparation by displaying a pause screen on a display screen of the client 11 of the moving destination can be expected.

As described above, when it is determined that neither the instruction for stopping playback nor the instruction for continuous playback preparation has been acquired in Step S16, the process proceeds to Step S21, where the CP31 of the moving source determines whether the playback of the selected content has been completed or not.

During the playback of the selected content is continued, the determination is negative in Step S21 and the process returns to Step S16, then, the processing after that is repeated.

On the other hand, when the playback of the selected content is completed, the determination is affirmative in Step S21, the processing of the CP 31 of the moving source ends.

[Processing Example of the DMR 32 of the Moving Source]

Figure 5:
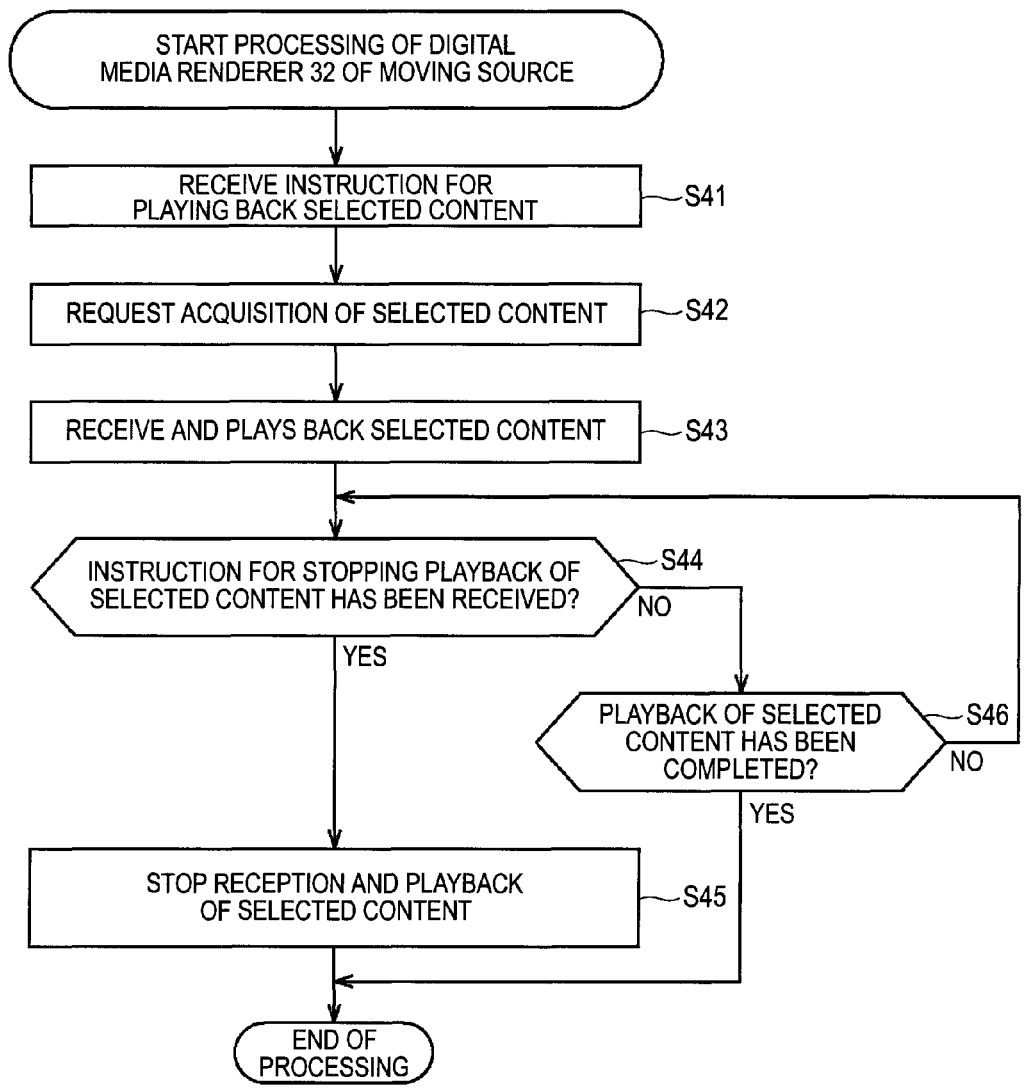
FIG. 5 is a flowchart for explaining a processing example of a digital media renderer of the moving source.

FIG. 5 is a flowchart for explaining a processing example of the DMR 32 of the client 11 of the moving source.

The processing of the DMR 32 of the moving source is started when the CP 31 of the moving source transmits the instruction for playing back the selected content in Step S15 of FIG. 4.

In Step S41, the DMR 32 of the moving source receives the instruction for playing back the selected content from the CP31 of the moving source. The playback instruction includes the place of acquiring the selected content. Specifically, the DMR 32 of the moving source receives the command "SETAVTransportURI" from the CP 31 of the moving source and sets the place of acquiring the content #1 as the selected content based on the command. The DMR 32 of the moving source further receives the command "Play" for instructing playback of the selected content from the CP 31 of the moving source.

In Step S42, the DMR 32 of the moving source requests the server 12 to acquire the selected content. Specifically, the DMR 32 of the moving source issues, for example, a command "HTTP_Get" for requesting the acquisition of the selected content and transmits the command to the server 12 where there is the place of acquiring the selected content.

As described later with reference to FIG. 8, the server 12 transmits the selected content from the head thereof to the client 11 of the moving source which is a request source in response to the request when receiving the request for acquiring the selected content from the DMR 32 of the moving source (Steps S101, S103 of FIG. 8).

In Step S43, the DMR 32 of the moving source receives and plays back the selected content from the server 12. In Step S44, the DMR 32 of the moving source determines whether the instruction for stopping playback of the selected content which is transmitted from the CP 31 of the moving source in Step S17 of FIG. 4 has been received or not.

For example, during a period in which the instruction for stopping playback of the selected content from the CP 31 of the moving source is not received, the determination is negative in Step S44 and the process proceeds to Step S46. Processing after Step S46 will be described later.

On the other hand, when the instruction for stopping playback of the selected content from the CP31 of the moving source is received, the determination is affirmative in Step S44 and the process proceeds to Step S45, where the DMR 32 of the moving source stops reception and playback of the selected content. Then, the processing of the DMR 32 of the moving source ends.

As described above, when it is determined that the instruction for stopping playback of the selected content has not been received in Step S44, the process proceeds to Step S46, where the DMR 32 of the moving source determines whether the playback of the selected content has been completed or not.

During the period in which the playback of the selected content is continued, the process returns to Step S44 and the processing after that is repeated.

On the other hand, when the playback of the selected content is completed, the determination is affirmative in Step S46 and the processing of the DMR 32 of the moving source ends.

Next, processing of the client 11 of the moving destination in the method of moving-source trigger continuous playback will be explained with reference to FIG. 6 and FIG. 7.

In the following explanation, a CP31-2 of the moving destination of the client 11 of the moving destination (referred to as the CP31 of the moving destination in the following description) and a DMR32-2 of the moving destination (referred to as the DMR32 of the moving destination in the following description) will be respectively main bodies of processing.

[Processing Example of the DMR 32 of the Moving Destination]

FIG. 6 is a flowchart for explaining a processing example of the DMR 32 of the moving destination.

The processing of the DMR 32 of the moving destination is started when the client 11 of the moving source transmits the instruction for changing the playback function to the available state in Step S19 of FIG. 4.

In Step S61, the DMR 32 of the client 11 of the moving destination receives the instruction for changing the playback function to the available state from the client 11 of the moving source. Specifically, for example, the DMR 32 of the moving destination receives the command "WakeupOnLan" from the CP 31 of the client 11 of the moving source.

In Step S62, the DMR 32 of the moving destination changes the playback function of the apparatus itself to the available state.

It is also preferable that, for example, the DMR 32 of the moving destination not only merely changing the playback function of the apparatus itself to the available state but also changing viewing functions such as a display function and an audio output function to the available state.

In Step S63, the DMR 32 of the moving destination receives the seeking and pause instructions concerning the selected content transmitted from the CP31 of the client 11 of the moving source in Step S20 of FIG. 4. The seeking instruction includes the continuous playback position PO as the seeking position. Specifically, for example, the DMR 32 of the moving destination receives the command "SET-AVTransportURI" from the CP 31 of the client 11 of the moving source and sets the place of acquiring the selected content (the specific place in the server 12) based on the command. The DRM 32 of the moving destination further receives the command "Seek" for seeking the continuous playback position PO of the selected content and the command "Pause" for allowing the selected content to pause transmitted from the CP 31 of the client 11 of the moving source.

In Step S64, the DMR 32 of the moving destination seeks the continuous playback position PO of the selected content and allows the selected content to pause there.

In Step S65, the DMR 32 of the moving destination receives a request for acquiring playback state information transmitted from the CP 31 of the moving destination in later-described Step S82 of FIG. 7. Specifically, the DRM 32 of the moving destination receives a command "GetTransportInfo" for requesting acquisition of the playback state. The DMR 32 of the moving destination further receives a command "GetPositionInfo" for requesting acquisition of a playback position concerning the selected content and a command "GetMediaInfo" for requesting acquisition of the place of acquiring the selected content from the CP31 of the moving destination.

In Step S66, the DMR 32 of the moving destination transmits playback state information as the information corresponding to the command received in Step S65 to the CP 31 of the moving destination. Specifically, for example, the DMR 32 of the moving destination transmits the playback state (for example, in the pause state) of the DMR 32 of the moving destination, a pause position of the selected content when it is in the pause state and the place of acquiring the selected content.

In Step S67, the DMR 32 of the moving destination receives an instruction for playing back the selected content from the continuous playback position PO, which is transmitted from the CP 31 of the moving destination in later-described Step S84 of FIG. 7. Specifically, for example, the DMR 32 of the moving destination receives the command "Play" for instructing playback of the selected content from the continuous playback position PO transmitted from the CP 31 of the client 11 of the moving source.

In Step S68, the DMR 32 of the moving destination requests the DMS 51 of the server 12 to acquire the content #1 as the selected content from the continuous playback position PO. Specifically, for example, the DMR 32 of the moving destination transmits a command "HTTP_Get (TimeSeekRange)" which is a command "HTTP_Get" in which the continuous playback position PO is designated as a start position "TimeSeekRange" to the DMS 51.

As described later, the DMS 51 receives the request for acquiring the selected content from the continuous playback position PO and transmits the selected contents from the continuous playback position PO to the DMR32 of the moving destination in response to the request (Steps S102, S104 of FIG. 8).

In Step S69, the DMR 32 of the moving destination receives and plays back the selected content from the server 12. Then, the processing of the DMR 32 of the moving destination ends.

[Processing Example of the CP 31 of the Moving Destination]

FIG. 7 is a flowchart for explaining a processing example of the CP 31 of the client 11 of the moving destination.

The processing of the CP 31 of the moving destination is started when the continuous playback is instructed to the client 11 of the moving destination by the user.

When the user moves to the bed room which is the moving destination, he/she tries to view the continuation of the selected content by using the client 11 of the moving destination. At this time, the selected content is in the pause state at the continuous playback position PO in the client 11 of the moving destination as has been explained with reference to FIG. 6 (Step S64 of FIG. 6).

Accordingly, the user operates the continuous playback button, for example, on a remote controller to thereby instruct the client 11 of the moving destination to perform the continuous playback. In Step S81, the CP of the moving destination acquires the instruction for the continuous playback.

It is also preferable that the continuous playback is instructed by using a playback button (PB button) normally prepared on a remote controller of a playback device instead without preparing the above dedicated continuous playback button on the remote controller and so on. In such case, the CP 31 of the moving destination acquires the operation as the instruction for continuous playback in the case where the playback state of the DMR 32 of the moving destination is in the pause state as well as the playback button has been operated.

In Step S82, the CP31 of the moving destination requests the DMR 32 of the moving destination to acquire playback state information. Specifically, for example, the CP 31 of the moving destination transmits the command "GetTransportInfo" for requesting acquisition of the playback state concerning the DMR 32 of the moving destination. The command "GetTransportInfo" is not always necessary, however, the command is important because playback state information is transmitted from the DMR 32 of the moving destination in response to the command in Step S66 of FIG. 6 and a playback preparation state can be determined by the command.

When the continuous playback preparation of the selected content has been completed in the DMR 32 of the moving destination, the selected content is in the pause state at the continuous playback position PO (during pause playback). Accordingly, when the playback state of the DMR 32 of the moving destination is in the pause state, it is determined that the DMR 32 is during playback preparation. Therefore, the playback preparation state of the DMR 32 of the moving destination can be determined based on the playback state of the DMR 32 of the moving destination.

The CP 31 of the moving destination transmits the command "GetPositionInfo" for requesting acquisition of a playback position concerning the content in the pause state (selected content) to the DMR 32 of the moving destination. The DMR 32 of the moving destination is in the pause state at the continuous playback position PO when the continuous playback preparation of the selected content has been completed as described above. Therefore, the continuous playback position PO can be acquired by acquiring the pause position. The CP of the moving destination transmits the command "GetMediaInfo" for requesting acquisition of the place of acquiring the selected content as the content in the pause state to the DMR 32 of the moving destination.

As described above, the DMR32 of the moving destination transmits the playback state information to the CP 31 of the moving destination which is the request source in response to the request when receiving the request for acquiring playback state information (Step S66 of FIG. 6). The playback state information includes the playback state, the playback position, the place of acquisition concerning the content and the like.

In Step S83, the CP 31 of the moving destination receives the playback state information and recognizes the content in the pause state as the selected content as well as recognizes the pause position as the continuous playback position PO respectively based on the information as described above.

In Step S84, the CP 31 of the moving destination instructs the DMR 32 of the moving destination to play back the selected content from the continuous playback position PO. Specifically, for example, the CP 31 of the moving destination issues the command "Play" for instructing playback of the selected content from the continuous playback position PO and transmits the command to the DMR 32 of the moving destination. Then, the processing of the CP 31 of the moving destination ends.

Accordingly, the selected content is played back from the continuous playback position PO in the DMR 32 of the moving destination as has been explained with reference to FIG. 6 (Step S69 of FIG. 6).

[Processing Example of the DMS 51]

Next, processing of the server 12 in the method of moving-source trigger continuous playback will be explained with reference to FIG. 8 and FIG. 9. In the following explanation, the DMR 51 of the server 12 and the CDS 61 as part of the DMR 51 will be respectively main bodies of processing.

FIG. 8 is a flowchart for explaining a processing example of the DMS 51 of the server 12.

The processing of the DMS 51 is started when the DMR 32 of the client 11 of the moving source or the moving destination transmits the request for acquiring the content (Step S42 of FIG. 5 and Step S68 of FIG. 6).

In Step S101, the DMS 51 receives the request for acquiring the content from the DMR 32 of the moving source or the moving destination. Specifically, for example, the DMS receives the command "HTTP_Get" or the command "HTTP_Get(TimeSeekRange)" transmitted from the DRM 32 of the moving source or the moving destination (Step S42 of FIG. 5 and Step S68 of FIG. 6).

In Step S102, the DMS 51 determines whether the start position is designated or not in the received request for acquiring the content.

For example, when the start position is not designated in the received request for acquiring the content, the process proceeds to Step S103, where the DMS 51 transmits the content from the head to the request source. Specifically, the DMS 51 transmits the content from the head position when receiving the command "HTTP_Get" transmitted from the DMR 32 of the moving source in the processing of Step S42 of FIG. 5, because the start position "TimeSeekRange" is not designated in the command. Then, the processing of the DMS 51 ends.

On the other hand, when the start position is designated in the received request for acquiring the content, the process proceeds to Step S104, where the DMS 51 transmits the content from the start position to the request source. Specifically, for example, the DMS 51 transmits the content from the start position "TimeSeekRange2 when receiving the command "HTTP_Get (TimeSeekRange)" transmitted from the DMR 32 of the moving destination in the processing of Step S68 of FIG. 6. Then, the processing of the DMS 51 ends.

As described above, the content is transmitted from the server 12 to the client 11.

[Processing Example of the CDS 61]

FIG. 9 is a flowchart for explaining a processing example of the CDS 61 of the server 12. The processing of the CDS 61 is referred to as the first processing of the CDS 61 in the following description to discriminate the processing from processing described later with reference to FIG. 21.

The first processing of the CDS 61 is started when the CP 31 of the moving source transmits the request for acquiring the content list (Step S12 of FIG. 4).

In Step S121, the CDS 61 receives the request for acquiring the content list from the CP 31 of the moving source (Step S12 of FIG. 4). Specifically, for example, the CDS 61 receives the command "CDS: Browse" from the CP 31 of the moving source.

In Step S122, the CDS 61 transmits the content list on the server 12 to the request source. The content list is received by the CP 31 of the moving source 31 in Step S13 of FIG. 4. Then, the first processing of the CDS 61 ends.

In the later described second embodiment, the first processing of the CDS 61 is executed also when the request for acquiring the content list from the CP 31 of the moving destination is transmitted.

[Processing Examples Among Respective Functional Blocks]

Figure 11:
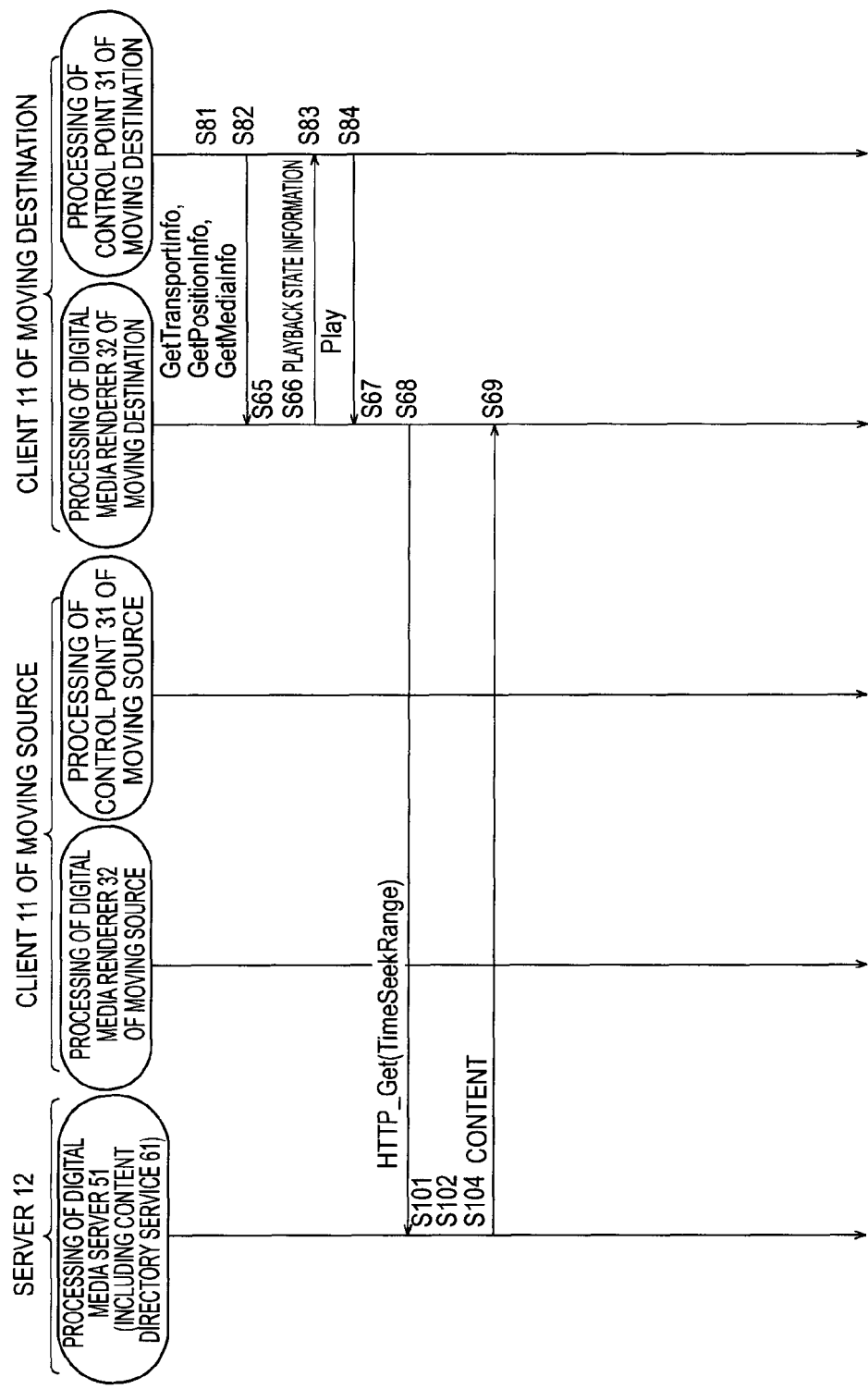
FIG. 11 is a flowchart for explaining a processing example among respective functional blocks.

FIG. 10 and FIG. 11 are flowcharts showing processing examples among the above respective functional blocks in an integrated manner. The leftmost flowchart of them represents processing at the server 12, and the second and third flowcharts from the left represent processing of the client 11 of the moving source. The fourth flowchart from the left and the rightmost flowchart represent processing of the client 11 of the moving destination.

When the display of the content list is instructed by the user, the CP 31 of the moving source acquires an instruction for displaying the content list as the processing of Step S11. The CP 31 of the moving source transmits the command "CDS: Browse" for requesting supply of the content list to the CDS 61 of the server 12 as the processing of Step S12.

The CDS 61 transmits the content list stored in the server 12 to the CP 31 of the client 11 of the moving source as the processing of Step S122 when receiving the command "CDS: Browse" as the processing of the Step S121.

The CP 31 of the moving source receives the content list as the processing of Step S13, displaying respective contents in the content list so as to be selected.

When the user selects a content of a desired name in the displayed content list, the CP 31 of the moving source acquires the selection of the content as the processing of Step S14. The CP 31 of the moving source executes the following processing as the processing of Step S15. That is, the CP 31 of the moving source transmits the command "SETAVTransportURI" for requesting setting of the place of acquiring the selected content and the command "Play" for instructing playback of the selected content to the DMR 32 of the client 11 of the moving source.

The DMR 32 of the moving source receives the command "SETAVTransportURI" and sets the place of acquiring the selected content as well as receives the command "Play" as the processing of Step S41. The DMR 32 of the moving source transmits the command "HTTP_Get" for requesting the server 12 to acquire the selected content to the server 12 set as the place of acquisition as the processing as Step S42.

The DMS 51 of the server 12 receives the command "HTTP_Get" as the processing of Step S101. The start position is not designated in the command "HTTP_Get", therefore, the determination is negative in the processing of Step S102 and the process proceeds to Step S103. The DMS 51 transmits the selected content from the head position which has been requested with respect to the DMR 32 of the client 11 of the moving source which is the request source as the processing of Step S103.

The DMR 32 of the moving source receives and plays back the selected content from the server 12 as the processing of Step S43.

The CP 31 of the client 11 of the moving source determines whether the instruction for stopping playback or instruction for continuous playback preparation by the user or not as the processing of Step S16. In the example of FIG. 10, the user operates the continuous playback preparation by operating the continuous playback preparation button. Then, the determination is affirmative in Step S16 and the process proceeds to Step S17.

The CP 31 of the moving source transmits the command "STOP" for instructing the DMR 32 of the moving source to stop playback of the selected content as the processing of Step S17.

The DMR 32 of the moving source determines whether the instruction for stopping the playback of the selected content has been received or not as the processing of Step S44. In the case of FIG. 10, the instruction for stopping playback of the selected content from the CP 31 of the moving source is received, therefore, the determination is affirmative in this case in Step S44 and the process proceeds to Step S45. The DMR 32 of the moving source stops reception and playback of the selected content as the processing of Step S45.

The CP 31 of the moving source determines whether the instruction of the user determined in Step S16 is the instruction for continuous playback preparation or not after transmitting the command "STOP" as the processing of Step S18. When the instruction of the user is the instruction for continuous playback preparation, the determination is affirmative in Step S18 and the processing proceeds to Step S19. The CP 31 of the moving source transmits the command "WakeupOnLan" for instructing the change of the playback function to the available state to the DMR 32 of the moving destination as the processing of Step S19.

The DMR 32 of the client 11 of the moving destination receives the command "WakeupOnLan" as the processing of Step S61 and changes the playback function of the apparatus itself to the available state as the processing of Step S62.

The CP31 of the moving source executes the following processing after transmitting the command "WakeupOn-Lan" as the processing of Step S20. That is, the CP 31 of the moving source transmits the command "SETAVTransportURI" for requesting setting of the place of acquiring the selected content to the client 11 of the moving destination. The CP 31 of the moving source further transmits the command "Seek" for seeking the continuous playback position PO as the seek position of the selected content and the command "Pause" for allowing the selected content to pause.

The DMR 32 of the client 11 of the moving destination sets the place of acquiring the selected content (specific place of the server 12) when receiving the command "SET-AVTransportURI" based on the command as the processing of Step S63. The DMR 32 of the moving destination further receives the command "Seek" and the command "Pause". The DMR 32 of the moving destination seeks the continuous playback position PO of the selected content and allows the content to pause as the processing of Step S64.

When the user moved to the bed room which is the moving destination instructs the client 11 of the moving destination to perform continuous playback, the CP 31 of the moving destination acquires the instruction for continuous playback as the processing of Step S81 as shown in FIG. 11. The CP 31 of the moving destination transmits the command "GetTransportInfo" for requesting acquisition of the playback state concerning the DMR 32 of the moving destination to the DMR 32 of the moving destination as the processing of Step S82. The CP 31 of the moving destination performs the following processing as the processing of Step S82. That is, the CP 31 of the moving destination transmits the command "GetPOsitionInfo" for requesting acquisition of the playback position concerning the selected content in the pause state and also the command "GetMediaInfo" for requesting acquisition of the place of acquiring the selected content as the content in the pause state.

The DMR 32 of the moving destination receives the command "GetTransportInfo", the command "GetPositionInfo" and the command "GetMediaInfo" as the processing of Step S65. The DMR of the moving destination transmits playback state information which is the information corresponding to these commands to the CP 31 of the client 11 of the moving destination as the processing of Step S66. That is, the DMR 32 of the moving destination transmits the playback state of the DMR 32 of the moving destination, the pause position of the selected content in the pause state when the content is in the pause state and the place of acquiring the selected content.

The CP 31 of the moving destination receives playback state information and recognizes the content in the pause state as the selected content and the pause position as the continuous playback position PO respectively based on the information as the processing of Step S83. The CP 31 of the moving destination transmits the command "Play" for instructing playback of the selected content from the continuous playback position PO to the DMR 32 of the moving destination as the processing of Step S84.

The DMR 32 of the moving destination receives the command "Play" as the processing of Step S67. The DMR 32 of the moving destination transmits the command "HTTP_Get (TimeSeekRange)" in which the continuous playback position PO is designated as the start position "TimeSeekRange" to the DMR 51 of the server 12 as the processing of Step S68.

The DMR 51 receives the command "HTTP_Get (TimeSeekRange)" as the processing of Step S101. The DMR 51 determines whether the start position TimeSeekRange is designated in the received command "HTTP_Get" or not as the processing of Step S102. In the example of FIG. 11, the start position TimeSeekRange is designated in the received command "HTTP_Get", therefore, the process proceeds to Step S104. The DMS 51 transmits the content from the start position "TimeSeekRange" to the DMR 32 of the client 11 of the moving destination which is the request source as the processing of Step S104.

The DMR 32 of the moving destination receives and plays back the selected content as the processing of Step S69.

As described above, in the method of moving-source trigger continuous playback method, the user can perform the continuous playback by operating the remote controller and so on just once after moving to another room. That is, the change of the playback function to the available state, the search for the content during continuous playback preparation and the like can be performed without complicated work by the user, namely, automatically. Accordingly, operationality of apparatus can be remarkably improved.

<Modification Example of First Embodiment>

In the above explained First Embodiment, the client 11 of the moving destination is designated by the user, therefore, the preparation for continuous playback is instructed only to the designated client 11 of the moving destination. On the other hand, there may be a case where the continuous playback is desired to be performed without specifying the client 11 of the moving destination. In this case, preparation for continuous playback is instructed with respect to all the clients 11-2 to 11-N (referred to as clients 11 of moving destination candidates) which can be moving destination candidates in the information processing system 1. The method of instructing all the clients 11 of moving destination candidates to make preparation for continuous playback is referred to as a method of instructing continuous playback to all moving destinations.

The method of instructing continuous playback to all moving destinations as the modification example of the first embodiment will be explained with reference to FIG. 12 to FIG. 16. An information processing system to which the method of instructing continuous playback to all moving destinations is applied has the same configuration as the information processing system 1. Therefore, the explanation will be made by using the information processing system 1 as follows.

In the method of instructing continuous playback to all moving destinations, the clients 11 of moving destination candidates receive the instruction for continuous playback preparation transmitted from the client 11 of the moving source and make preparation for continuous playback concerning the selected content in response to the instruction. That is, the clients 11 of the moving destination candidates seek the continuous playback position PO in the selected content (the content #1 in this case) and allow the content to pause there.

After that, the client 11 (the client 11-2 in this case) in the room where the user has actually moved (moving destination) in the clients 11 of moving destination candidates plays back the content #1 as the selected content from the continuous playback position PO in response to the instruction for continuous playback preparation. The client 11 of the moving destination instructs remaining clients 11 of moving destination candidates (the client 11-3 to the client 11-N) to change the playback function to the available state. These remaining clients 11 of the moving destination candidates change the playback function of apparatus themselves to a sleep state.

Accordingly, only the client 11 of the moving destination in the clients 11 of moving destination candidates can be made in the playback state.

Processing of the client 11 of the moving source, the client 11 of the moving destination and the server 12 in the above-described method of instructing continuous playback to all moving destinations will be explained.

First, processing of the CP 31 and the DMR 32 of the client 11 of the moving source will be explained. The processing of the DMR 32 of the moving source is the same as the processing of the DMR 32 of the moving source in the method of moving-source trigger continuous playback, therefore, explanation thereof is omitted.

[Processing Example of the CP 31 of the Moving Source]

Figure 12:
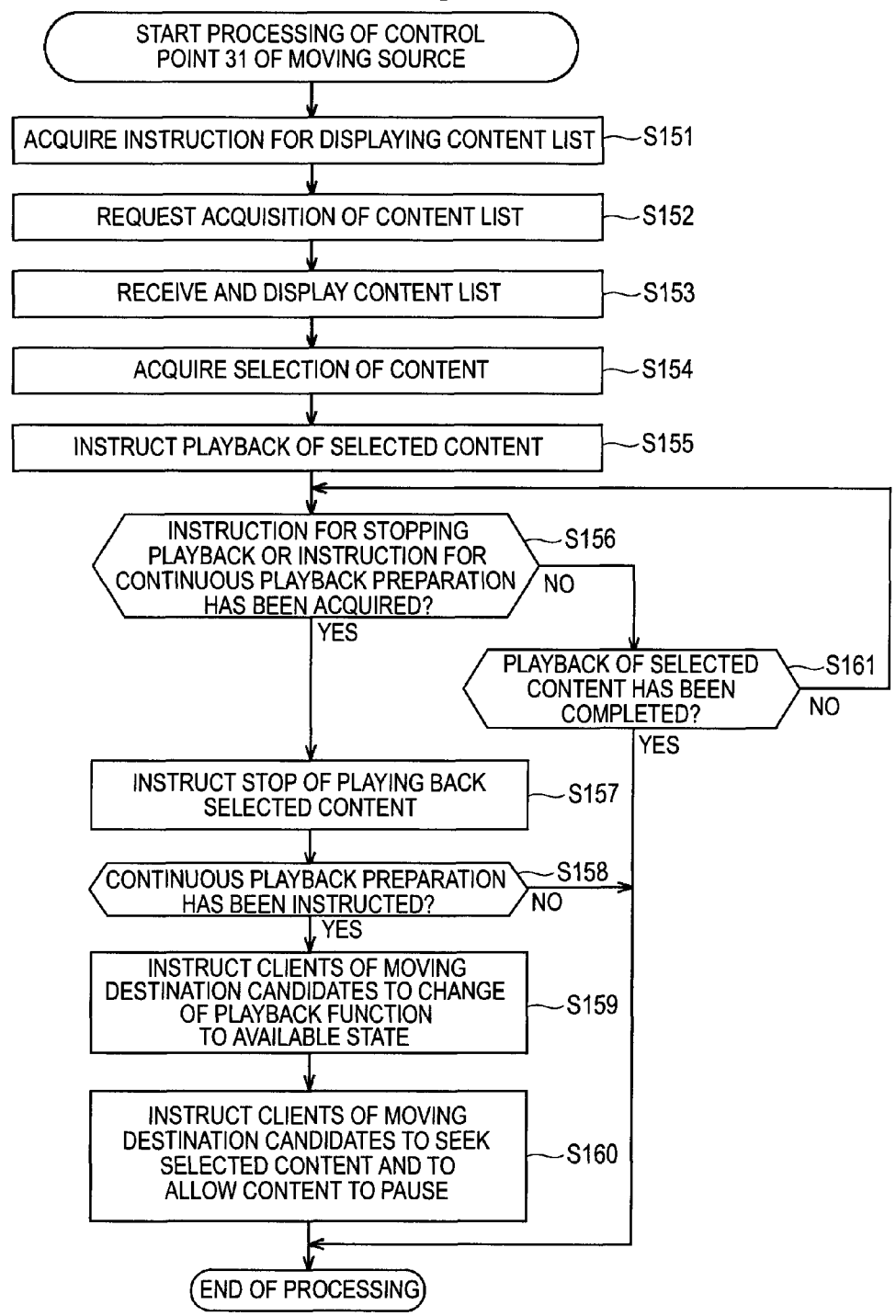
FIG. 12 is a flowchart for explaining a processing example of the control point of the moving source.

FIG. 12 is a flowchart for explaining a processing example of the CP 31 of the moving source.

Processing of Step S151 to Step S158 is the same as the processing of Step S11 to Step S18 in FIG. 4, respectively. Therefore, the explanation of these processing is omitted.

When the instruction for continuous playback preparation is given, the CP 31 of the moving source instructs the DMRs 32 of the clients 11 of moving destination candidates (referred to as the DMRs 32 of moving destination candidates in the following description) to change the playback function to the available state. Specifically, the CP 31 of the moving source issues the command "WakeupOnLan" and transmits the command to the clients of moving destination candidates.

As described later with reference to FIG. 14, the DMRs 32 of moving destination candidates receive the instruction of changing the playback function to the available state from the CP 31 of the moving source and change the playback function of apparatus themselves to the available state in response to the instruction (Steps S201, S202 of FIG. 14).

In Step S160, the CP 31 of the moving source instructs the DMRs 32 of moving destination candidates to seek the selected content and allows the content to pause. The seek instruction includes the continuous playback position PO as the seek position. Specifically, the CP 31 of the moving source issues the command "SETVTransportURI" for requesting setting of the place of acquiring the selected content and transmits the command to the DMRs 32 of the moving destination candidates. The CP 31 of the moving source further issues the command "Seek" for seeking the selected content at the continuous playback position PO as the seek position and the command "Pause" for allowing the selected content to pause and transmits the commands to the DMRs 32 of moving destination candidates. Then, the processing of the CP 31 of the moving source ends.

As described later with reference to FIG. 14, the clients 11 of moving destination candidates seek the selected content at the continuous playback position PO and allow the content to pause there in response to the seeking and pause instructions from the CP 31 of the moving source (Steps S203, S204 of FIG. 14). Accordingly, the preparation for continuous playback in the clients 11 of moving destination candidates is completed.

Processing of Step S161 is the same as the processing of Step S21 in FIG. 4, therefore, the explanation thereof is omitted.

That is, only the client 11 of the moving destination designated by the user makes preparation for continuous playback in the processing of FIG. 4, whereas all clients of moving destination candidates make preparation for continuous playback in the processing of FIG. 12.

Next, processing of the CP 31 and the DMR 32 of the client of the moving destination in the method of the above-described method of instructing continuous playback to all moving destinations will be explained. The processing of the DMR 32 of the moving destination is the same as the processing of the DMR 32 of the moving destination in the method moving-source trigger continuous playback, therefore, the explanation is omitted.

[Processing Example of the CP 31 of the Moving Destination]

Figure 13:
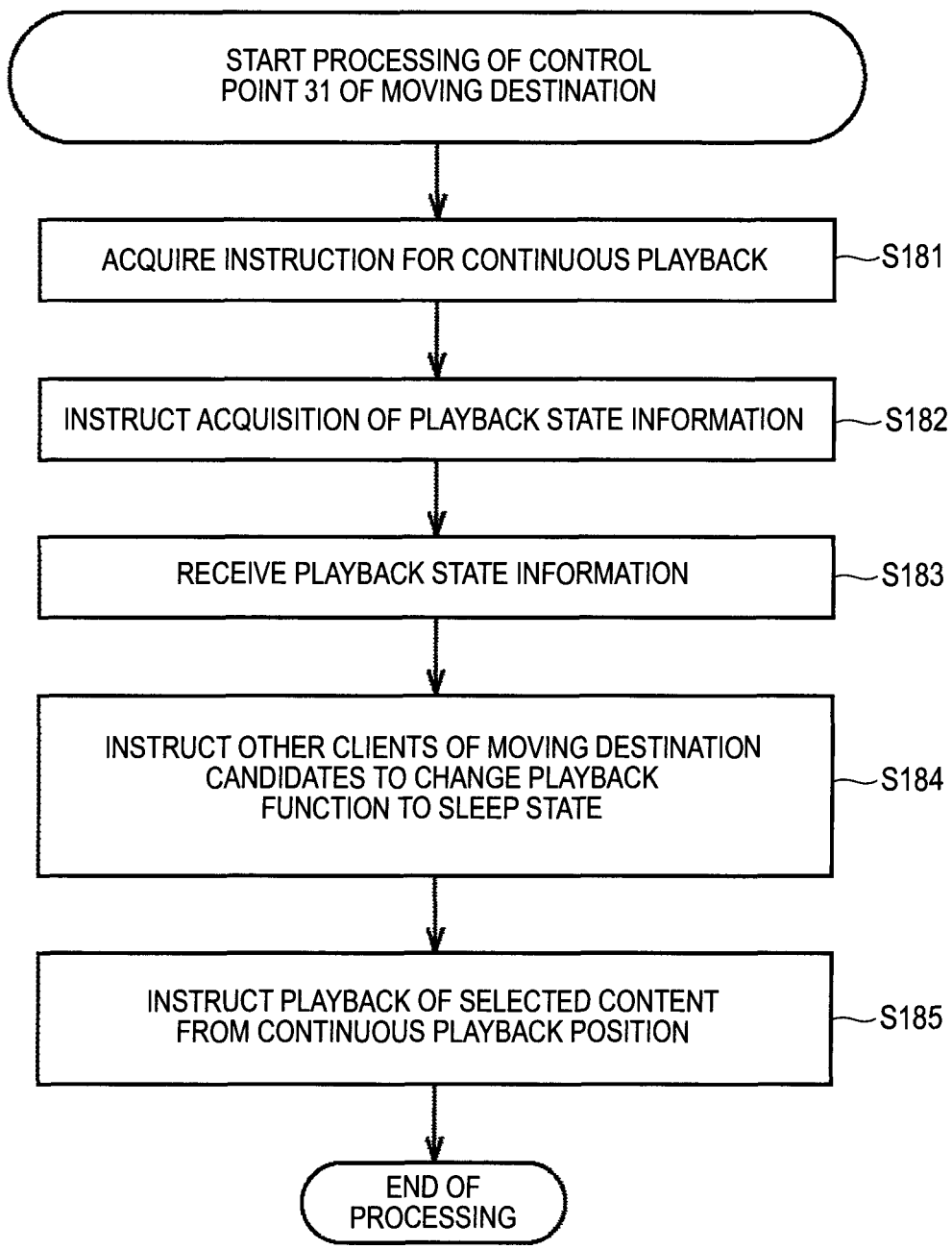
FIG. 13 is a flowchart for explaining a processing example of the control point of the moving destination.

FIG. 13 is a flowchart for explaining a processing example of the CP 31 of the moving destination.

Processing of Step S181 to Step S183 are the same as the processing of Step S81 to Step S83 in FIG. 7. Therefore, the explanation of these processing is omitted.

The CP 31 of the moving destination instructs other DMRs 32 of the moving destination candidates to change the playback function to the sleep state in Step S184 after receiving playback state information from the DMR 32 of the moving destination. That is, the client 11 to which the instruction of continuous playback is inputted by the user will be the client 11 of the moving destination from the client 11 of the moving destination candidate. Accordingly, other clients 11 of moving destination candidates are instructed to be the original sleep state by the client 11 of the moving destination.

After that, in Step S185, the CP 31 of the moving destination instructs the DMR 32 of the moving destination to play back the selected content from continuous playback position in the same manner as the processing of Step S64 in FIG. 6.

Next, processing of the CPs 31 and the DMRs 32 of the clients 11 of moving destination candidates in the method of instructing continuous playback to all moving destinations will be explained. The CP 31 which has become the moving destination in the CPs 31 of the moving destination candidates has been already explained. The processing concerning continuous playback is not performed in other CPs 31 of the moving destination candidates, therefore, the explanation thereof is omitted.

[Processing Example of the DMRs 32 of Moving Destination Candidates]

Figure 14:
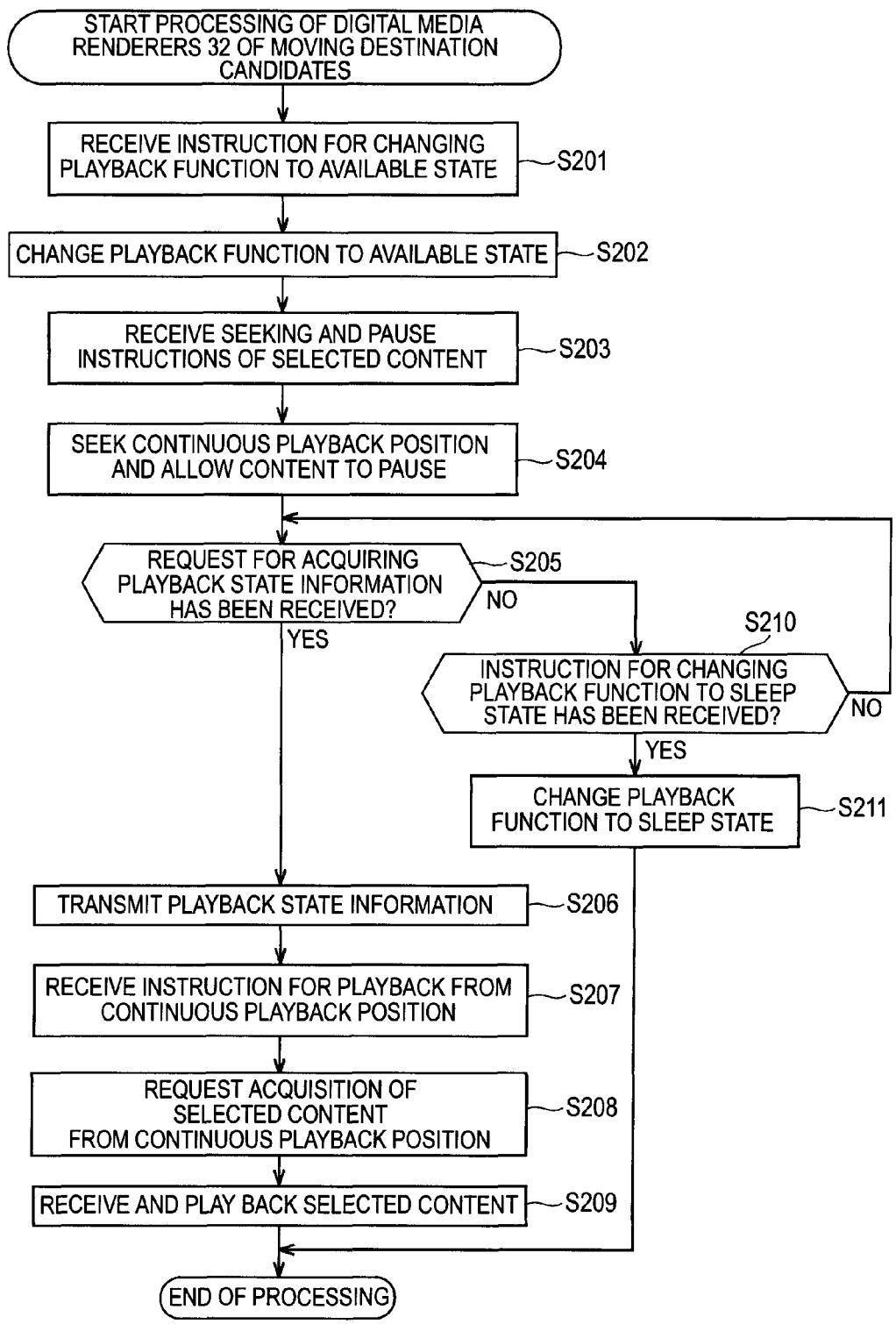
FIG. 14 is a flowchart for explaining a processing example of digital media renderers of moving destination candidates.

FIG. 14 is a flowchart for explaining a processing example of the DMRs 32 of moving destination candidates.

Processing of Step S201 to Step S204 is the same as the processing obtained by replacing the DMR 32 of the moving destination in Step S61 to Step S64 in FIG. 6 with processing of the DMRs 32 of the moving destination candidates. Therefore, the explanation of these processing is omitted.

After the continuous playback position is sought and the content becomes in the pause state, the DMRs 32 of moving destination candidates determine in Step S205 whether the DMRs have received the request for acquiring playback state information transmitted from the CP 31 of the moving destination in Step S182 of FIG. 13 or not. Specifically, the DMRs of moving destination candidates determine whether they have received all of the command "GetTransportInfo", the command "GetPOsitionInfor" and the command "GetMediainfo" or not.

For example, during a period in which the DRM 32 of moving destination candidate does not receive the request for acquiring playback state information, the determination is negative in Step S205 and the process proceeds to Step S210. Processing after Step S210 will be described later.

On the other hand, when the DMR 32 of moving destination candidate has received the request for acquiring playback state information, the determination is affirmative in Step S205 and the process proceeds to Step S206.

Processing of Step S206 to Step S209 are the same as the processing obtained by replacing the DMR 32 of moving destination with the DMRs 32 of moving destination candidates in Step S66 to Step S69 in FIG. 6. Therefore, the explanation of these processing is omitted. That is, the processing performed when the moving destination candidate of the DMR 32 becomes the moving destination will be executed.

As described above, when it is determined that the request for acquiring playback state information has not been received in Step S205, the process proceeds to Step S210. In Step S210, whether the instruction for changing the playback function to the sleep state transmitted from the CP 31 of the moving destination in Step S184 of FIG. 13 has been received or not is determined in Step S210.

During a period in which the instruction for changing the playback function to the sleep state is not received, the determination is negative in Step S210 and the process returns to Step S205, then, processing after that is repeated.

After that, when the instruction for changing the playback function to the sleep state has been received, the DMRs 32 of moving destination candidates change the playback function to the sleep state. After that, the processing of the DMRs 32 of moving destination candidates ends.

[Processing Examples Among Respective Functional Blocks]

Figure 15:
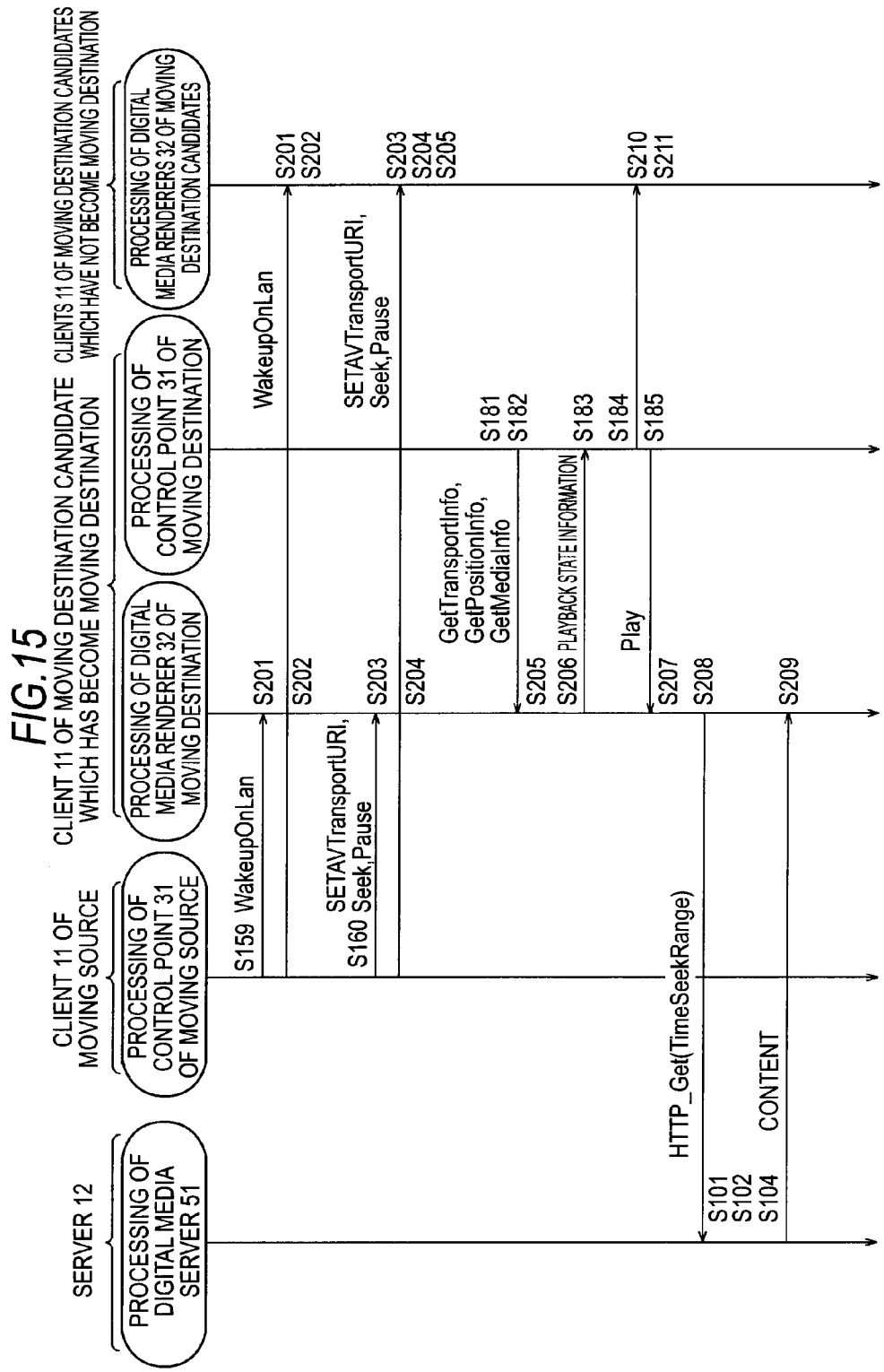
FIG. 15 is a flowchart showing a processing example among respective functional blocks.

FIG. 15 is a chart showing processing examples among the above respective functional blocks in an integrated manner. The leftmost flowchart in the chart represents processing at the server 12, and the second flowchart from the left represents processing of the client 11 of the moving source. The third and fourth flowcharts from the left represent processing of the client 11 of moving destination candidate which has become the moving destination. The rightmost flowchart represents processing of the clients 11 of the moving destination candidates which have not become the destination.

In the method of instructing continuous playback to all moving destinations, playback of the content and playback stop based on the instruction for continuous playback are executed by the client 11 and the server 12 in cooperation with each other in the same manner as the method of moving-source trigger continuous playback with reference to FIG. 10. Accordingly, these processing is omitted in FIG. 15 and processing among respective functional blocks after the processing of Step S159 is described, in which the client 11 of the moving source transmits the command "WakeupOnLan" to the clients 11 of the moving destination candidates.

That is, when the instruction for continuous playback preparation is given by the user, the CP 31 of the moving source (instruction source) transmits the command "WakupOnLan" to the DMRs 32 of the clients 11 of moving destination candidates as the processing of Step S159.

The DMRs 32 of the clients 11 of moving destination candidates receive the command "WakupOnLan" as the processing of Step S201 and change the playback function of the apparatus themselves to the available state.

The CP 31 of the moving source transmits the command "SETAVTransportURI" for requesting setting of the place of acquiring the selected content to the DMRs 32 of the clients 11 of moving destination candidates as the processing of Step S160. The CP 31 of the moving source further executes the following processing as the processing of Step S160. That is, the CP 31 of the moving source transmits the command "Seek" for seeking the selected content at the continuous playback position PO as the seek position and the command "Pause" for allowing the selected content to pause there to the DRMs of the clients 11 of moving destination candidates.

The DRMs 32 of the clients 11 of moving destination candidates receive the command "SETAVTransportURI" as the processing of Step S203 and set the place of acquiring the selected content (specific place in the server 12) based on the command. The DRMs 32 of the clients 11 of moving destination candidates further receive the command "Seek" for seeking the continuous playback position PO of the selected content and the command "Pause" for allowing the selected content to pause transmitted form the CP 31 of the client 11 of the moving source as the processing of Step S203.

The DRMs 32 of the clients 11 of moving destination candidates seeks the continuous playback position PO of the selected content and allows the content to pause there as the processing of Step S204.

When the user moved to the bed room which is the moving destination instructs the client 11 of the moving destination, the moving destination candidates until then becomes the moving destination. The CP 31 of the moving destination acquires the instruction for continuous playback as the processing of Step S181. The CP 31 of the moving destination transmits the command "GetTransporInfo" for requesting acquisition of the playback state concerning the DMR 32 of the moving destination to the DMR 32 of the moving destination as the processing of Step S182. The CP 31 of the moving destination executes the following processing as the processing of Step S182. That is, the CP 31 of the moving destination further transmits the command "GetPOsitionInfo" for requesting acquisition of the playback position concerning the selected content in the pause state and the command "GetMediaInfo" for requesting acquisition of the place of acquiring the selected content as the content in the pause state.

The DMR 32 of the moving destination receives these command "GetTransportInfo", the command "GetPositionInfo" and the command "GetMediaInfo" as the processing of Step S205. The DMR 32 of the moving destination transmits playback state information which is the information corresponding to these commands to the CP 31 of the client 11 of the moving destination as the processing of Step S206. That is, the DMR 32 of the moving destination transmits the playback state of the DMR 32 of the moving destination, the pause position of the selected content in the pause state when it is in the pause state and the place of acquiring the selected content.

The CP 31 of the moving destination receives the playback state information as the processing of S183 and recognizes the content in the pause state as the selected content and the pause position as the continuous playback position PO respectively based on the information. The CP 31 of the moving destination instructs other DMRs 32 of moving destination candidates which have not become the moving destination to change the playback function to the sleep state. The DMRs 32 of moving destination candidates change the playback function to the sleep state as the processing of Step S211 when receiving the instruction for changing the playback function to the sleep state as the processing of Step S211.

The CP 31 of the moving destination transmits the command "Play" for instructing playback of the selected content from the continuous playback position PO to the DMR 32 of the moving destination as the processing of Step S185.

The DMR 32 of the moving destination receives the command "Play" as the processing of Step S207. The DMR 32 of the moving destination transmits the command "HTTP_Get(TimeSeekRange)" in which the continuous playback position PO is designated as the continuous playback position "TimeSeekRange" to the DMS 51 of the server 12 as the processing of Step S208.

The DMS 51 receives the command "HTTP_Get (TimeSeekRange)" as the processing of Step S101. The DMS 51 determines whether the start position "TimeSeekRange" is designated in the received command "HTTP_Get" or not as the processing of Step S102. In the example of FIG. 15, the start position "TimeSeekRange" is designated in the received command "HTTP_Get", therefore, the process proceeds to Step S104. The DMS 51 transmits the content from the start position "TimeSeekRange" to the DMR 32 of the client 11 of the moving destination which is the request source as the processing of Step S104.

The DMR 32 of the moving destination receives and plays back the selected content as the processing of Step S209.

<Second Embodiment>

In the first embodiment and the modification example thereof which have been explained as the above, when the continuous playback is instructed with respect to the client 11 of the moving destination by the user, the CP 31 of the moving destination executes the following processing. That is, the CP 31 of the moving destination recognizes the selected content as the content the continuous playback of which has been instructed and the continuous playback position PO thereof from information (playback state information) acquired from the DMR 32 of the moving destination (Step S83 of FIG. 7, FIG. 11 and Step S183 in FIG. 13, FIG. 15). However, it is also possible to recognize the selected content as the content the continuous playback of which has been instructed and the continuous playback position PO thereof from information acquired from the CDS 61 of the server 12. A method of recognizing the selected content and the continuous playback position PO thereof from information acquired from the CDS 61 is referred to as a method of continuous playback using the CDS.

The method of continuous playback using the CDS as the second embodiment will be explained with reference to FIG. 17 to FIG. 23. An information processing system to which the method of continuous playback using the CDS is applied has the same configuration as the information processing system 1. Therefore, the explanation will be made by using the information processing system 1 as follows.

In the method of continuous playback using the CDS, the CDS 61 manages, for example, bookmarks including information (referred to as continuous playback preparation state information in the following description) indicating continuous playback preparation state of respective clients 11 and continuous playback positions "P" according to each content by adding the bookmarks to the content list. The continuous playback position "P" simply means a value of the continuous playback position described in the bookmark "B". That is, only when the continuous playback preparation state information indicates that the content is during preparation for continuous playback, the value has a meaning as the continuous playback position PO.

In a technique of UPnP (Universal Plug and Play) used in the DLNA, the bookmark is defined as a vendor unique. That is, the vendor can design the bookmark freely. The details of the content list to which the above-described bookmarks "B" are added as an example of the bookmark will be explained with reference to FIG. 16.

[Example of the Content List]

Figure 16:
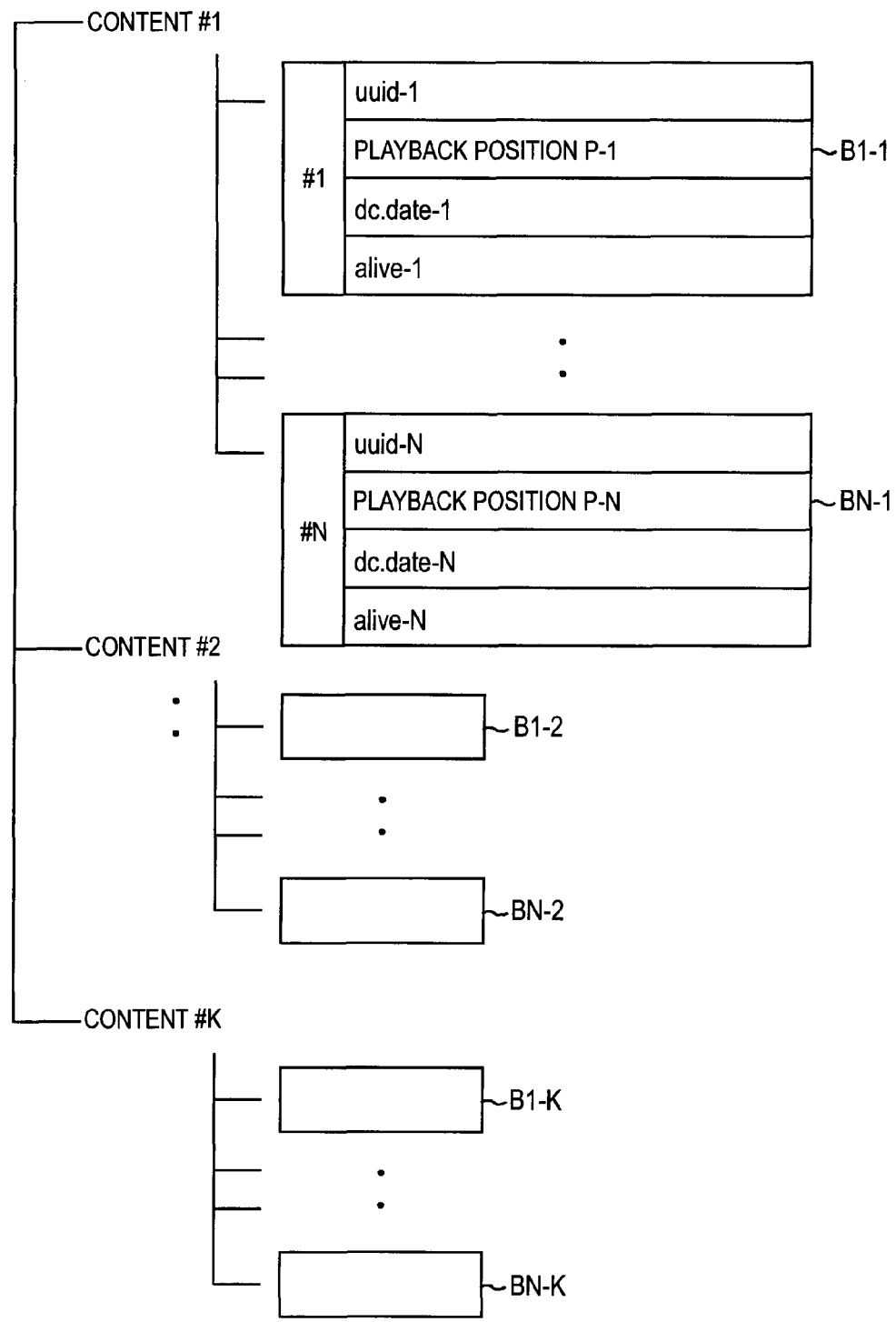
FIG. 16 is a diagram showing an example of a content list.

FIG. 16 is a chart showing an example of the content list.

In the example of FIG. 16, k-pieces of contents #1 to #k are registered in the content list. Bookmarks B1-1 to BN-1 indicating respective continuous playback states of the DMR 32-1 to the DMR 32-N are associated with the content #1. Bookmarks B1-2 to BN-2 indicating respective continuous playback states of the DMR32-1 to the DMR 32-N are associated with the content #2. Bookmarks B1-K to BN-K indicating respective continuous playback states of the DMR32-1 to the DMR 32-N are associated with the content #K.

When respective bookmarks Bi-1 to Bi-K ($1 \le i \le N$) are not particularly discriminated from one another, they are referred to as a bookmark "Bi".

For example, the bookmark B1 in the example of FIG. 16 includes an identification number #1 indicating an identification number "bookmarkID" of the bookmark B1 and an identification number "uuid-1" indicating an identification number "uuid" of the DMR 32-1. The bookmark B1 includes a continuous playback position P-1 indicating the playback position "P" (also written as a playback position "RelativeTimePosition") in the DMR 32-1. The bookmark B1 includes time information "dc.date-1" concerning a time point at which the continuous playback was instructed in the DMR 32-1. The bookmark B1 includes a flag "alive-1" indicating whether continuous playback preparation state concerning the DMR 32-1 shows that the content is during continuous playback preparation or not. The bookmarks B2 to BN are also the same.

The CP 31 of the moving destination searches the bookmark "B" indicating that the continuous playback preparation state information showing that the content is during the continuous playback preparation from all bookmarks "B" described above. Then, the CP 31 of the moving destination acquires the selected content as the content corresponding to the searched bookmark "B", namely, the content during continuous playback preparation and the continuous playback position "P" (namely, the continuous playback position PO) of the content.

Processing of the CP 31 and the DMR 32 of the client 11 of the moving source in the method of continuous playback using the CDS which uses the bookmark "B" described above will be explained. The processing of the DMR 32 of the moving source is the same as the processing of the DMR 32 of the moving source in the method of moving-source trigger continuous playback (processing of FIG. 5), therefore, explanation of the processing is omitted. The first processing of the CDS 61 of the server 12 and the processing of the DMS 51 are the same as the cases explained with reference to FIG. 9 and FIG. 8, therefore, explanation of these processing is omitted.

[Processing Example of the CP 31 of the Moving Source]

Figure 17:
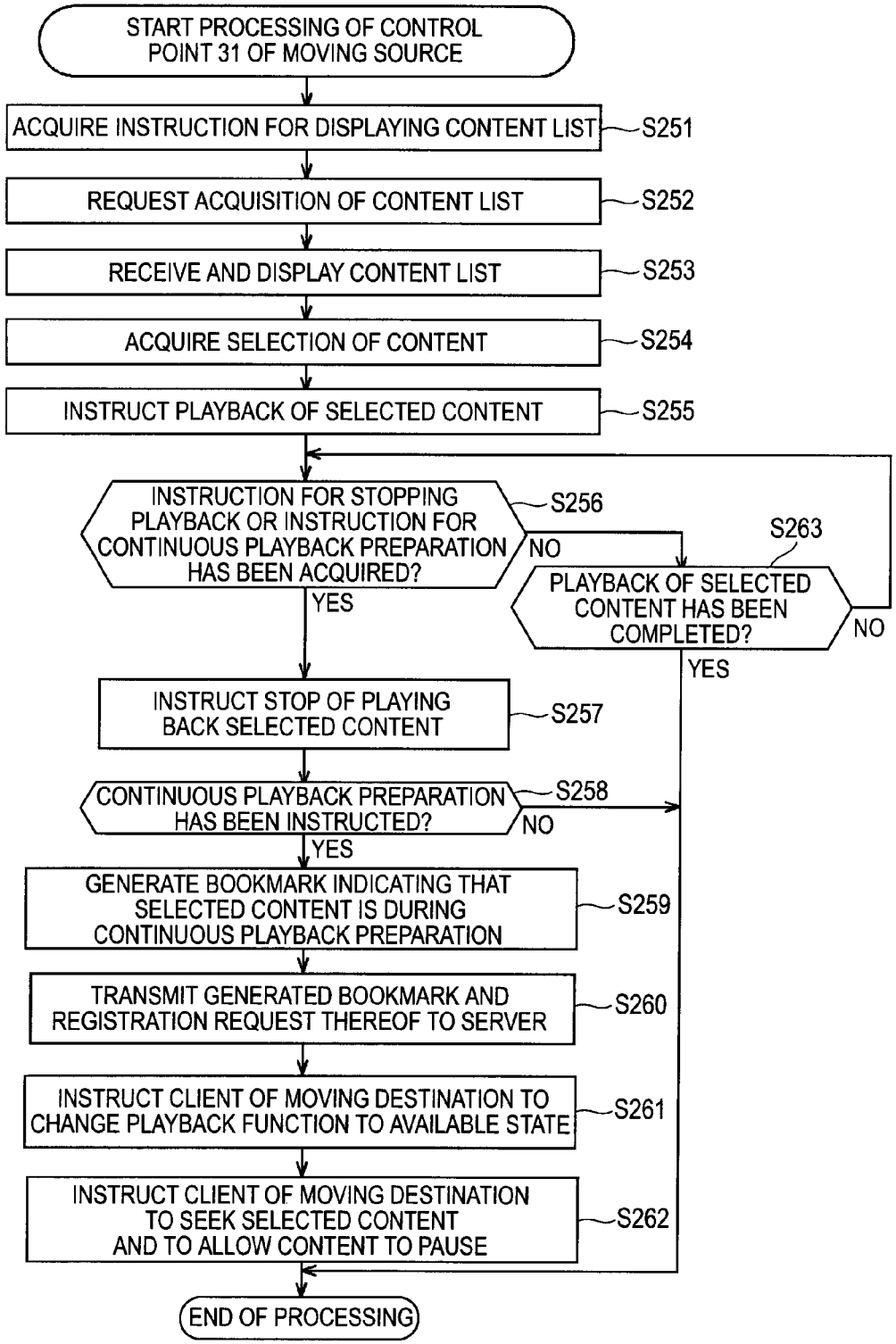
FIG. 17 is a flowchart for explaining a processing example of the control point of the moving source.

FIG. 17 is a flowchart for explaining a processing example of the CP 31 of the moving source.

Processing of Step S251 to Step S258 and processing of Step S261 to Step S263 is the same as the processing of Step S11 to Step S21 in FIG. 4. FIG. 17 differs from FIG. 4 in a point that Step S259 and Step S260 are inserted between Step S258 and Step S261 corresponding to Step S18 and Step S19 of FIG. 4.

When it is determined that the instruction for continuous playback preparation has been made in Step S258, that is, when the instruction for continuous playback preparation is given by the user, the CP 31 (CP31-1) of the moving source generates a bookmark B1-1 indicating that the selected content (the content #1 in this case) is during continuous preparation in the CP 31 of the moving source (CP31-1) in Step S259. Specifically, the CP 31 of the moving source generates, for example, the bookmark B1-1 including the identification number "uuid-1", the continuous playback position PO as the continuous playback position P-1 and TRUE (valid) as the flag alive-1.

In Step S260, the CP 31 of the moving source transmits the generated bookmark B1-1 and a request for registering the bookmark to the CDS 61 of the server 12. Specifically, the CP 31 of the moving source transmits, for example, a command "CDS: Create(Bookmark)" for requesting the CDS 61 to register the bookmark B1-1 to the server 12.

As described later with reference to FIG. 20, the CDS registers the bookmark B1-1 in the content list by associating the bookmark with the content having the identification number #1 (content #1) when receiving the bookmark B1-1 and the registration request thereof (Steps S321, S322 of FIG. 20).

Other processing is the same as the processing of FIG. 4. Therefore, explanation of these processing is omitted.

Next, processing of the CP 31 and the DMR 32 of the client 11 of the moving destination will be explained.

[Processing Example of the CP 31 of the Moving Destination]

Figure 18:
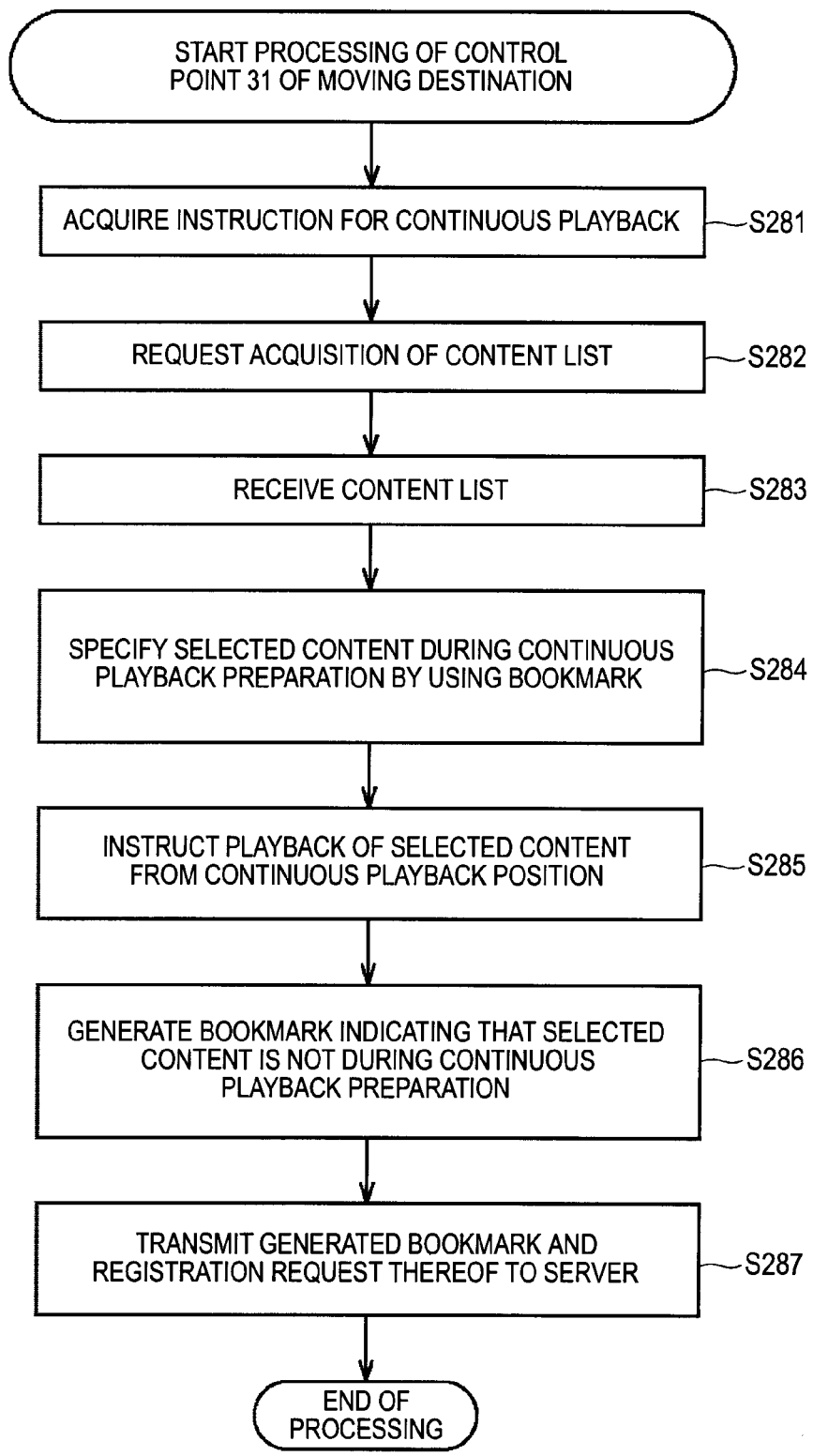
FIG. 18 is a flowchart for explaining a processing example of the control point of the moving destination.

FIG. 18 is a flowchart for explaining a processing example of the CP 31 of the moving destination.

In Step S281, the CP 31 of the moving destination acquires the instruction for continuous playback based on the user operation. The processing is the same as the processing of Step S81 of FIG. 7.

In Step S282, the CP 31 of the moving destination requests the CDS 61 of the server 12 to acquire the content list. Specifically, the CP 31 of the moving destination issues, for example, the command "CDS: Browse" for requesting acquisition of the content list to the CDS 61 and transmits the command to the server 12.

In Step S283, the CP 31 of the moving destination receives the content list transmitted by the CDS 61 of the server 12 in Step S122 of FIG. 9. However, the second embodiment differs from the first embodiment in a point that the bookmarks as shown in FIG. 16 are added to the content list transmitted by the CDS 61. That is, the CDS 61 of the server 12 adds the bookmark B1-1 to the content list in later-described Step 322 of FIG. 20 in accordance with the registration request of Step S260 of FIG. 17.

In Step S284, the CP 31 of the moving destination specifies the content (selected content) during the continuous playback preparation by using the bookmark "B" added to the received content list. Specifically, the CP 31 of the moving destination acquires, for example, bookmarks B1-1 to BN-1, B1-2 to BN-2, . . . B1-K to BN-K. The CP 31 of the moving destination searches the bookmark in which the flag "alive" indicates TRUE (valid) from the bookmarks B1-1 to B1-K concerning the DMR 32 (DMR32-1) of the moving source in these bookmarks. Accordingly, the bookmark of the selected content during continuous playback preparation is searched. In this example, the bookmark B1-1 is searched. The CP 31 of the moving destination recognizes the content #1 as the selected content based on the searched bookmark B1-1 as well as recognizes the continuous playback position P-1 of the searched bookmark B1-1 as the continuous playback position PO.

In Step S285, the CP 31 of the moving destination instructs the DMR 32 of the moving destination to play back the selected content from the continuous playback position PO. Specifically, the CP 31 of the moving destination issues, for example, the command "Play" for instructing the DMR 32 of the moving destination to play back the selected content from the continuous playback position PO to the client 11 of the moving destination. A specific operation performed by the user at this time is just an operation of a play button.

As described later with reference to FIG. 19, the DMR 32 of the moving destination performs reception and playback of the selected content from the server 12 based on the instruction when receiving the instruction of playback of the selected content from the continuous playback position PO (Steps S305 to S307 of FIG. 19).

In Step S286, the CP 31 of the moving destination generates the bookmark B1-1 indicating that the selected content (content #1 in this case) is not during continuous playback preparation in the CP 31 (CP31-1) of the moving source. Specifically, for example, the CP 31 of the moving destination generates the bookmark B1-1 including the identification number "uuid-1" of the DMR 32-1 of the moving source, a cleared value as the continuous playback position P-1 and a cleared value as the flag "alive-1".

In Step S287, the CP 31 of the moving destination transmits the generated bookmark B1-1 and the registration request thereof to the server 12. Specifically, the CP 31 of the moving destination transmits, for example, the command "CDS: Create(Bookmark)" for requesting registration of the bookmark to the server 12. Then, the processing of the CP 31 of the moving destination ends.

As described later with reference to FIG. 20, the server registers the bookmark B1-1 in the content list by associating the bookmark with the content #1 having the identification number #1 when receiving the bookmark B1-1 and the registration request thereof (Step S322 of FIG. 20). Accordingly, the flag "alive-1" of the bookmark B1-1 on the server 12 is cleared.

Though the bookmark concerning the content during continuous playback preparation is searched by using the flag "alive" in the second embodiment, it is also possible to search the bookmark concerning the content during continuous playback preparation by using the time information "dc.date" and so on.

In such case, the CP 31 of the moving destination searches a bookmark in which the time information "dc.date" is closest to the current time in the bookmarks B1-1 to B1-K concerning the DMR 32 (DMR 32-1) of the moving source as the bookmark of the selected content during continuous playback preparation. Accordingly, the content having the closest time information and thereby having the highest possibility that the content is during continuous playback preparation is searched as the selected content.

[Processing Example of the DMR 32 of the Moving Destination]

Figure 19:
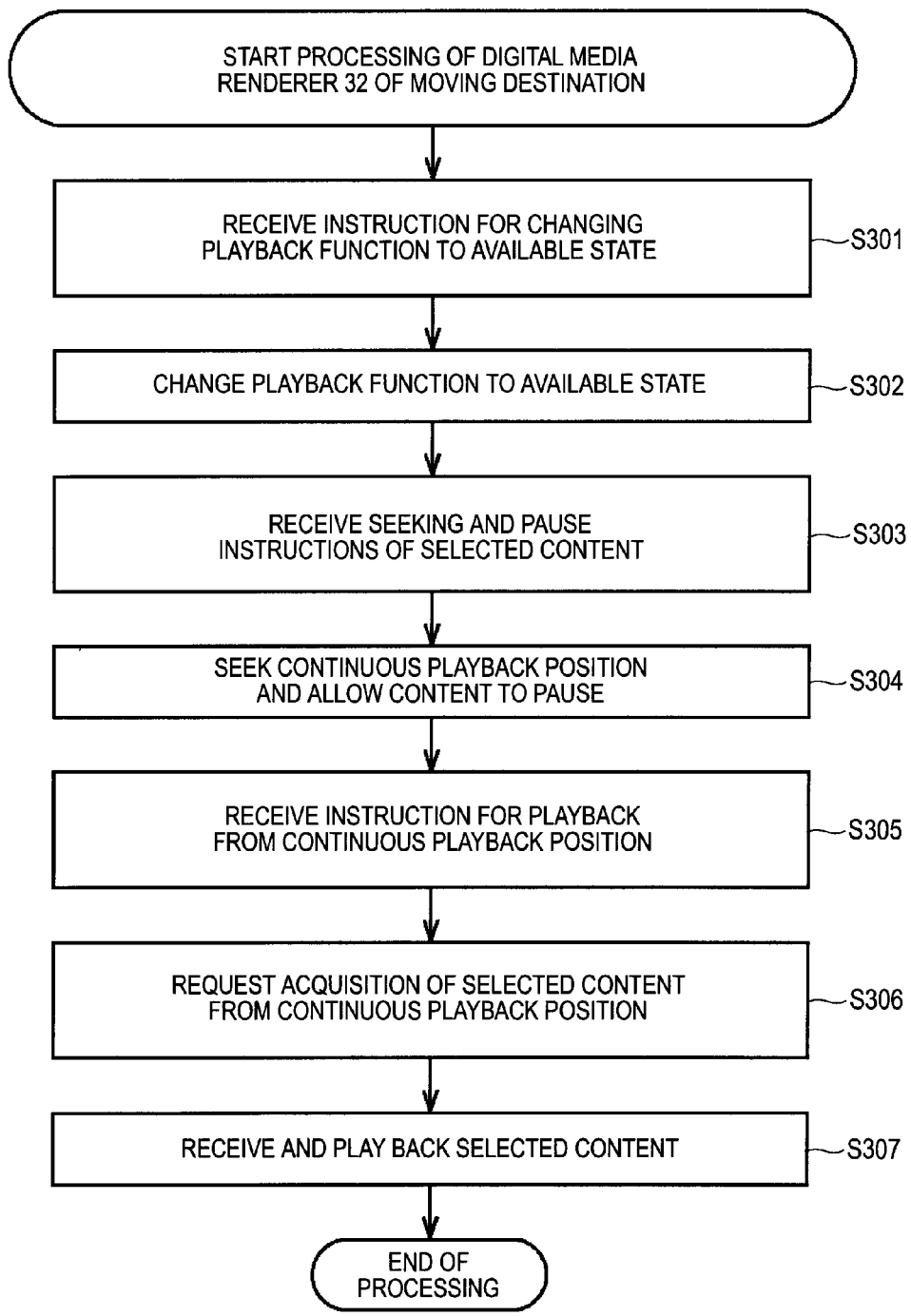
FIG. 19 is a flowchart for explaining a processing example of the digital media renderer of the moving destination.

FIG. 19 is a flowchart for explaining a processing example of the DMR 32 of the moving destination.

Processing of the DMR 32 of the moving destination in FIG. 19 is processing obtained by removing the processing of Step S65 and Step S66 from the processing of the DMR 32 of the moving destination in FIG. 6. That is, processing of Step S301 to Step S307 in FIG. 19 is the same as the processing of Step S61 to S64 and Step S67 to Step S69 in FIG. 6 respectively. Therefore, explanation of the DMR 32 of the moving destination is omitted.

Next, processing of the DMS 51 and the CDS 61 of the server 12 will be explained.

Processing of the DMS 51 is the same as the processing of the DMS 51 in the method of moving-source trigger continuous playback (processing of FIG. 8), therefore, explanation of the processing is omitted. The first processing of the CDS 61 is the same as the first processing of the CDS 61 in the method of moving-source trigger continuous playback (processing of FIG. 9), therefore, explanation of the processing is omitted.

The CDS 61 performs the second processing of registering the bookmark transmitted from the CP31 of the moving source or the moving destination in addition to the first processing.

[Example of the Second Processing of the CDS 61]

Figure 20:
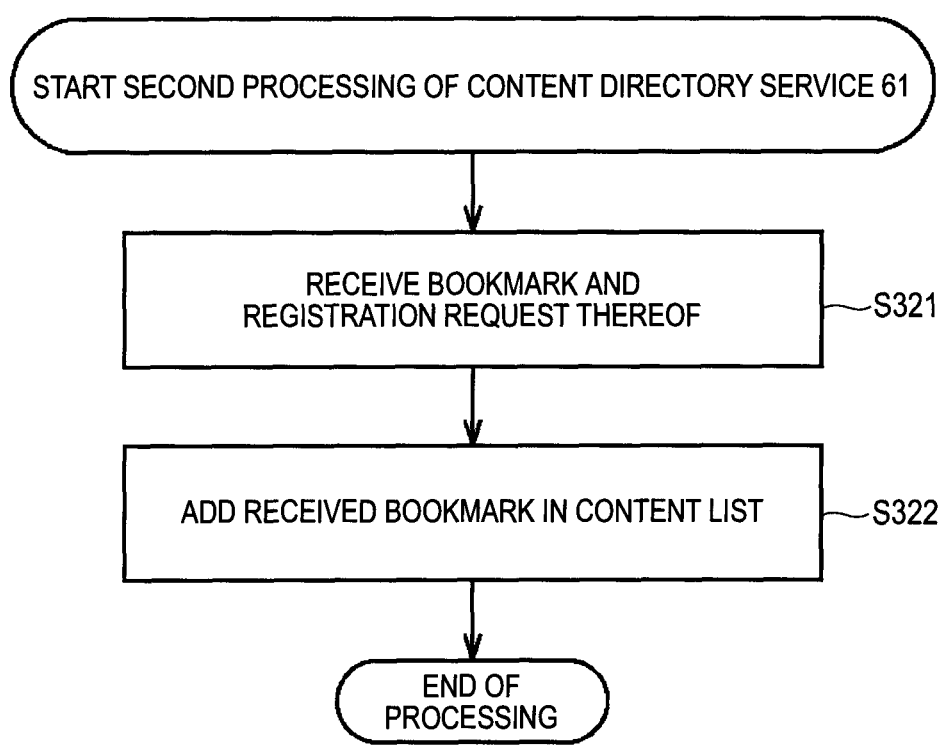
FIG. 20 is a flowchart for explaining a processing example of the content directory service.

FIG. 20 is a flowchart for explaining an example of the second processing of the CDS 61 of the server 12.

In Step S321, the CDS 61 receives the bookmark and the registration request transmitted from the CP 31 of the moving source or the moving destination in Step S260 of FIG. 17 or Step S287 of FIG. 18. Specifically, the CDS 61 receives the bookmark and the command CDS: Create (Bookmark) for requesting registration of the bookmark transmitted from the CP 31 of the moving source or the moving destination.

In Step S322, the CDS 61 adds (registers) the received bookmark (bookmark B1-1 in this example) in the content list by associating the bookmark with the content #1 having the identification number #1. Then, the second processing of the CDS 61 ends.

The CDS 61 of the server 12 does not create the bookmark by the apparatus itself but checks the bookmark the registration of which is requested by the CP 31 of the moving source or the moving destination and registers the bookmark. That is, the CDS 61 does not register the bookmark and transmits error information to the request source, for example, when the received bookmark does not have the data configuration shown in FIG. 16. The CDS 61 does not register the bookmark, for example, when the received bookmark is not transmitted from the specified client which is the client 11.

[Processing Example Among Respective Functional Blocks]

FIG. 21 and FIG. 22 are flowing charts showing processing examples among the above respective functional blocks in an integrated manner. The leftmost flowchart of them represents processing at the server 12, and the second and third flowcharts from the left represent processing of the client 11 of the moving source. The fourth flowchart from the left and the rightmost flowchart represent processing of the client 11 of the moving destination.

When the display of the content list is instructed by the user, the CP 31 of the client 11 of the moving source acquires an instruction for displaying the content list as the processing of Step S251. The CP 31 of the moving source transmits the command "CDS: Browse" for requesting supply of the content list to the DMS 51 of the server 12 as the processing of Step S252.

The CDS 61 transmits the content list stored in the server 12 to the CP 31 of the client 11 of the moving source as the processing of Step S122 when receiving the command "CDS: Browse" as the processing of the Step S121.

The CP 31 of the moving source receives the content list as the processing of Step S253, displaying respective contents in the content list so as to be selected.

When the user selects a content of a desired name in the displayed content list, the CP 31 of the moving source acquires the selection of the content as the processing of Step S254. The CP 31 of the moving source executes the following processing as the processing of Step S255. That is, the CP 31 of the moving source transmits the command "SETAVTransportURI" for requesting setting of the place of acquiring the selected content and the command "Play" for instructing playback of the selected content to the DMR 32 of the client 11 of the moving source.

The DMR 32 of the moving source receives the command "SETAVTransportURI" and sets the place of acquiring the selected content as well as receives the command "Play" as the processing of Step S41. The DMR 32 of the moving source transmits the command "HTTP_Get" for requesting the server 12 to acquire the selected content to the server 12 set as the place of acquisition as the processing as Step S42.

The DMS 51 of the server 12 receives the command "HTTP_Get" as the processing of Step S101. The start position is not designated in the command "HTTP_Get", therefore, the determination is negative in the processing of Step S102 and the process proceeds to Step S103. The DMS 51 transmits the selected content from the head position which has been requested with respect to the DMR 32 of the client 11 of the moving source which is the request source as the processing of Step S103.

The DMR 32 of the moving source receives and plays back the selected content from the server 12 as the processing of Step S43.

The CP 31 of the client 11 of the moving source determines whether the instruction of stopping playback or instruction for continuous playback preparation by the user or not as the processing of Step S256. In the example of FIG. 21, the user operates continuous playback preparation by operating the continuous playback preparation button. Then, the determination is affirmative in Step S256 and the process proceeds to Step S257.

The CP 31 of the moving source transmits the command "STOP" for instructing the DMR 32 of the moving source to stop playback of the selected content as the processing of Step S257.

The DMR 32 of the moving source determines whether the instruction for stopping the playback of the selected content has been received or not as the processing of Step S44. In the case of FIG. 21, the instruction of stopping playback of the selected content from the CP 31 of the moving source is received, therefore, the determination is affirmative in this case in Step S44 and the process proceeds to Step S45. The DMR 32 of the moving source stops reception and playback of the selected content as the processing of Step S45.

The CP 31 of the moving source determines whether the instruction of the user determined in Step S256 is the instruction for continuous playback preparation or not after transmitting the command "STOP" as the processing of Step S258. When the instruction of the user is the instruction for continuous playback preparation, the determination is affirmative in Step S258 and the processing proceeds to Step S259. The CP 31 of the moving source generates the bookmark B1-1 including the identification number "uuid-1", the continuous playback position PO as the continuous playback position P-1 and TRUE (valid) as the flag "alive-1" as the processing of Step S259.

The CP 31 of the moving source transmits the command "CDS:Create(Bookmark) for requesting registration of the bookmark B1-1 to the CDS 61 of the server 12 as the processing of Step S260.

The CDS 61 receives the bookmark B1-1 and the command "CDS:Create(Bookmark) for requesting registration thereof as the processing of Step S321. The CDS 61 registers the received bookmark B1-1 in the content list by associating the bookmark with the content #1 having the identification number #1 as the processing of Step S322.

After the command "CDS:Create(Bookmark) is transmitted, the CP31 of the moving source transmits the command "WakeupOnLan" for instructing the change of the playback function to the available state to the DMR 32 of the client 11 of the moving destination as the processing of Step S261.

The DMR 32 of the moving destination receives the command "WakeupOnLan" as the processing of Step S301 and changes the playback function of the apparatus itself to the available state as the processing of Step S302.

The CP31 of the moving source transmits the command "SETAVTransportURI" for requesting setting of a place of acquiring the selected content to the DMR 32 of the client 11 of the moving destination after transmitting the command "WakeupOnLan" as the processing of Step S262. The CP 31 of the moving source further transmits the command "Seek" for seeking the continuous playback position PO as the seek position of the selected content and the command "Pause" for allowing the selected content to pause.

The DMR 32 of the moving destination sets the place of acquiring the selected content (specific place of the server 12) based on the command when receiving the command "SETAVTransportURI" as processing of Step S303. The DMR 32 of the moving destination further receives the command "Seek" and the command "Pause" as processing of Step S303. The DMR 32 of the moving destination seeks the continuous playback position PO of the selected content and allows the content to pause as processing of Step S304.

When the user having moved to the bed room which is the moving destination instructs the client 11 of the moving destination to perform continuous playback, the CP 31 of the moving destination acquires the instruction for continuous playback as the processing of Step S281 as shown in FIG. 11. The CP 31 of the moving destination transmits the command "CDS: Browse" for requesting acquisition of the content list to the CDS 61 of the server 12 as processing of Step S282.

The CDS 61 receives the command "CDS: Browse" as the processing of Step S121 and transmits the content list to which the bookmark B1-1 registered in the processing of Step S321 of FIG. 21 is added to the CP 31 of the client 11 of the moving destination which is the request source as the processing of Step S122 of FIG. 22.

The CP 31 of the moving destination receives the content list as the processing of Step S283. The CP 31 of the moving destination executes the following processing as the processing of Step S284. That is, the CP 31 of the moving destination searches the bookmark in which the flag "alive" is TRUE (valid) from bookmarks B1-1 to B1-K concerning the DMR 32 (DMR 32-1) of the moving source added to the received content list. Accordingly, the bookmark of the selected content during continuous playback preparation is searched. In this example, the bookmark B1-1 is searched. The CP 31 of the moving destination further recognizes the content #1 as the selected content from the searched bookmark B1-1 and recognizes the continuous playback position P-1 of the bookmark B1-1 as the continuous playback position PO.

The CP 31 of the moving destination transmits the command "Play" for instructing the DMR 32 of the client 11 of the moving destination to play back the selected content from the continuous playback position PO.

The DMR 32 of the client 11 of the moving destination receives the command "Play" for instructing playback of the selected content from the continuous playback position PO as the processing of Step S305.

The CP 31 of the moving destination generates the bookmark B1-1 including the identification number "uuid-1" of the DMR 32-1 of the moving source, the cleared value as the continuous playback position P-1 and the cleared value as the flag "alive-1" as the processing of Step S286.

The CP 31 of the moving destination transmits the command "CDS:Create(Bookmark)" for requesting registration of the bookmark B1-1 generated to the CDS 61 of the server 12 as the processing of Step S287.

The CDS 61 receives the bookmark B1-1 and the command "CDS:Create(Bookmark)" for requesting the registration thereof as the processing of Step S321. The CDS 61 adds (registers) the bookmark B1-1 in the content list by associating the bookmark with the content #1 having the identification number #1 as the processing of Step S322.

The DMR 32 of the moving destination transmits the command "HTTP_Get(TimeSeekRange)" in which the continuous playback position PO is designated as the start position "TimeSeekRange" to the DMS 51 of the server 12 after receiving the command "Play" as the processing of Step S306.

The DMS 51 receives the command "HTTP_Get (TimeSeekRange)" as the processing of Step S101. The DMS 51 determines whether the start position "TimeSeekRange" is designated in the received command "HTTP_Get" or not as the processing of Step S102. In the example of FIG. 22, the start position "TimeSeekRange" is designated in the command "HTTP_Get", therefore, the process proceeds to Step S104. The DMS 51 transmits the content from the start position "TimeSeekRange" to the DMR 32 of the client 11 of the moving destination which is the request source as the processing of Step S104.

The DMR 32 of the moving destination receives and plays back the selected content as the processing of Step S307.

[Configuration Example of Hardware]

The above series of processing can be executed by hardware as well as software. When the series of processing is executed by software, programs included in the software are installed from program recording media. The programs are installed into, for example, a computer incorporated with dedicated hardware. The programs also installed into, for example, a general-purpose computer which is capable of executing various functions by installing various types of programs.

FIG. 23 is a block diagram showing a configuration example of hardware of a computer executing the above series of processing by programs.

In the computer, a CPU 101, a ROM (Read Only Memory) 102, a RAM (Random Access Memory) 103 are mutually connected through a bus 104. An input/output interface 105 is further connected to the bus 104. To the input/output interface 105, an input unit 106 including a keyboard, a mouse, a microphone and the like, an output unit 107 including a display, a speaker and the like and a storage unit 108 including hard disk, a non-volatile memory and the like are connected. A communication unit 109 including a network interface and the like, a drive 110 which drives removal media 111 such as a magnetic disc, an optical disc, a magneto-optical disc and a semiconductor memory are further connected to the input/output interface 105.

In the computer configured as the above, the CPU 101 executes programs stored, for example, in the storage unit 108 by loading them to the RAM 103 through the input/output interface 105 and the bus 104, thereby performing the above series of processing. Programs executed by the computer (CPU 101) are provided by being recorded in the removal media 111 which are magnetic discs (including flexible discs). Programs are provided by being recorded in the removable media 111 which are packaged media. As the packaged media, the optical disc (including CD-ROM (Compact Disc-Read Only Memory), DVD (Digital Versatile Disc) and so on), the magneto-optical disc, the semiconductor memory and the like are used. Programs are also provided through wired or wireless transmission media such as local area networks, Internet and digital satellite broadcast. The programs can be installed into the storage unit 108 through the input/output interface 105 by mounting the removable media 111 on the drive 110. The programs can be also installed into the storage unit 108 by being received by the communication 109 through the wired or wireless transmission media. Additionally, the programs can be installed into the ROM 102 or the storage unit 108 in advance.

Programs executed by the computer may be programs processed in time series along the order explained in the present specification or may be programs processed in parallel or at necessary timing such as when calling is performed.

The invention is not limited to the above-described embodiments and can be variously modified within a scope not departing from the gist thereof.

The present application contains subject matter related to that disclosed in Japanese Priority Patent Application JP 2009-180478 filed in the Japan Patent Office on Aug. 3, 2009, the entire contents of which is hereby incorporated by reference.

What is claimed is:

1. An information processing apparatus, comprising:
a playback means for requesting an information providing apparatus to transmit a content when a content playback has been instructed by a user, receiving the content transmitted from the information providing apparatus in response to the request, and playing back the content; and
a control means for, in response to receiving an instruction for continuous playback preparation, automatically transmitting an instruction for stopping playback of the content to the playback means as well as transmitting an instruction for continuous playback preparation to another information processing apparatus in a sleep state, in which power consumption is suppressed and a playback function of contents is unavailable,
the content comprises video content having a plurality of image frames,
the instruction for the continuous playback preparation causes the another information processing apparatus upon receipt thereof and without input from the user to automatically
change from the sleep state to a playback state, wherein the playback function of contents is available in the playback state,
seek a continuous playback position which is a position of the content where the playback has been stopped,
set an identifier for acquiring the content from the information providing apparatus, and
cause a respective image frame of the plurality of image frames of the video content which exists at the continuous playback position to be displayed in a paused manner on a display screen associated with the another information processing apparatus upon completion of the continuous playback preparation so as to provide an indication to the user of the completion of the continuous playback preparation,
wherein when the continuous playback preparation is instructed by the user and there are a plurality of information processing apparatuses that are selectable as the another information processing apparatus a menu of the plurality of information processing apparatuses is generated, and when the continuous playback preparation is instructed by the user and there is only one information processing apparatus that is selectable as the another information processing apparatus the one information processing apparatus is automatically selected as the another information processing apparatus.

2. The information processing apparatus according to claim 1,
wherein the control means transmits information indicating that the content is during continuous playback preparation and given information including the continuous playback position to the information providing apparatus and registers these information therein when the continuous playback preparation is instructed by the user.

3. The information processing apparatus according to claim 1, wherein the control means transmits the instruction for continuous playback preparation to other plural information processing apparatus.

4. An information processing method implemented by an information processing apparatus including a playback means and a control means, the method comprising the steps of:
requesting, by the playback means, an information providing apparatus to transmit a content when a content playback has been instructed by a user;
receiving and playing back, by the playback means, the content transmitted from the information providing apparatus in response to the request; and
when continuous playback preparation is instructed by the user, automatically stopping playback of the content by the playback means, and transmitting an instruction for the continuous playback preparation to another information processing apparatus in a sleep state, in which power consumption is suppressed and a playback function of contents is unavailable, the content comprises video content having a plurality of image frames, the instruction for the continuous playback preparation causes the another information processing apparatus upon receipt thereof and without input from the user to automatically change from the sleep state to a playback state, wherein the playback function of contents is available in the playback state, seek a continuous playback position which is a position of the content where the playback has been stopped, set an identifier for acquiring the content from the information providing apparatus, and cause a respective image frame of the plurality of image frames of the video content which exists at the continuous playback position to be displayed in a paused manner on a display screen associated with the another information processing apparatus upon completion of the continuous playback preparation so as to provide an indication to the user of the completion of the continuous playback preparation, wherein when the continuous playback preparation is instructed by the user and there are a plurality of information processing apparatuses that are selectable as the another information processing apparatus a menu of the plurality of information processing apparatuses is generated, and when the continuous playback preparation is instructed by the user and there is only one information processing apparatus that is selectable as the another information processing apparatus the one information processing apparatus is automatically selected as the another information processing apparatus.

5. A non-transitory computer-readable medium storing computer program that, when executed, causes a computer to execute a process for processing information, the computer program allowing the computer to function as:

a playback means for requesting an information providing apparatus to transmit a content when a content playback has been instructed by a user, receiving the content transmitted from the information providing apparatus in response to the request, and playing back the content; and a control means for, in response to receiving an instruction for continuous playback preparation, automatically transmitting an instruction for stopping playback of the content to the playback means as well as transmitting an instruction for continuous playback preparation to another information processing apparatus in a sleep state, in which power consumption is suppressed and a playback function of contents is unavailable, the content comprises video content having a plurality of image frames, the instruction for the continuous playback preparation causes the another information processing apparatus upon receipt thereof and without input from the user to automatically change from the sleep state to a playback state, wherein the playback function of contents is available in the playback state, seek a continuous playback position which is a playback stop position of the content when the continuous playback preparation is instructed by the user, set an identifier for acquiring the content from the information providing apparatus, and cause a respective image frame of the plurality of image frames of the video content which exists at the continuous playback position to be displayed in a paused manner on a display screen associated with the another information processing apparatus upon completion of the continuous playback preparation so as to provide an indication to the user of the completion of the continuous playback preparation, wherein when the continuous playback preparation is instructed and there are a plurality of information processing apparatuses that are selectable as the another information processing apparatus a menu of the plurality of information processing apparatuses is generated, and when the continuous playback preparation is instructed and there is only one information processing apparatus that is selectable as the another information processing apparatus the one information processing apparatus is automatically selected as the another information processing apparatus.

6. An information processing apparatus, comprising:

a playback means for:

receiving an instruction for continuous playback preparation for playback of a content transmitted from an information providing apparatus to another information processing apparatus as an instruction source in a sleep state, in which power consumption is suppressed and a playback function of contents is unavailable, the content comprises video content having a plurality of image frames, the instruction for the continuous playback preparation including a command for instructing the another information processing apparatus to change from the sleep state to a playback state, wherein the playback function of contents is available in the playback state, the continuous playback position, an identifier for acquiring the content from the information providing apparatus, and a command for allowing the content to pause at the continuous playback position, wherein when the continuous playback preparation is instructed and there are a plurality of information processing apparatuses that are selectable as the another information processing apparatus a menu of the plurality of information processing apparatuses is generated, and when the continuous playback preparation is instructed and there is only one information processing apparatus that is selectable as the another information processing apparatus the one information processing apparatus is automatically selected as the another information processing apparatus;

in response to receiving the instruction and without input from a user, the information processing apparatus automatically performs (i) setting an identifier for acquiring the content from the information providing apparatus based on the place of acquiring the content from the information providing apparatus included in the instruction, (ii) seeking a continuous playback position in the content based on the continuous playback position included in the instruction, and (iii) displaying a respective image frame of the plurality of image frames of the video content which exists at the continuous playback position in a paused manner on a display screen; and a control means for controlling the playback means to play back the content from the continuous playback position when continuous playback is instructed by a user.

7. The information processing apparatus according to claim 6,
wherein the instruction for continuous playback preparation is transmitted also to other information processing apparatus other than the instruction source, and
the control means requests other information processing apparatus other than the instruction source to change from a playback state thereof into a sleep state when continuous playback is instructed by the user.

8. The information processing apparatus according to claim 6,
wherein the control means acquires the content during continuous playback preparation and the continuous playback position from the playback means when continuous playback is instructed by the user and controls the playback means to play back the content from the continuous playback position based on the position.

9. The information processing apparatus according to claim 6,
wherein information indicating that the content is during continuous playback preparation and given information including the continuous playback position are registered in the information providing apparatus, and
the control means acquires the given information registered in the information providing apparatus when continuous playback is instructed by the user and controls the playback means to play back the content from the continuous playback position based on the information.

10. An information processing method implemented by an information processing apparatus including a playback means and a control means, the method comprising the steps of:
receiving an instruction for continuous playback preparation for playback a content transmitted from an information providing apparatus to another information processing apparatus as an instruction source in a sleep state, in which power consumption is suppressed and a playback function of contents is unavailable,
the content comprises video content having a plurality of image frames,
the instruction for the continuous playback preparation including
a command for instructing the another information processing apparatus to change from the sleep state to a playback state, wherein the playback function of contents is available in the playback state,
the continuous playback position,
an identifier for acquiring the content from the information providing apparatus, and
a command for allowing the content to pause at the continuous playback position,
wherein when the continuous playback preparation is instructed and there are a plurality of information processing apparatuses that are selectable as the another information processing apparatus a menu of the plurality of information processing apparatuses is generated, and when the continuous playback preparation is instructed and there is only one information processing apparatus that is selectable as the another information processing apparatus the one information processing apparatus is automatically selected as the another information processing apparatus;
in response to receiving the instruction and without input from a user, automatically performing (i) setting an identifier for acquiring the content from the information providing apparatus based on the place of acquiring the content from the information providing apparatus included in the instruction, (ii) seeking a continuous playback position in the content based on the continuous playback position included in the instruction, and (iii) displaying a respective image frame of the plurality of image frames of the video content which exists at the continuous playback position in a paused manner on a display screen; and
playing back the content from the continuous playback position by the playback means when continuous playback is instructed by the user.

11. A non-transitory computer-readable medium storing computer program that, when executed, causes a computer to execute a process for processing information, the computer program allowing the computer to function as:
a playback means for:
receiving an instruction for continuous playback preparation for playback a content transmitted from an information providing apparatus to another information processing apparatus as an instruction source in a sleep state, in which power consumption is suppressed and a playback function of contents is unavailable,
the content comprises video content having a plurality of image frames,
the instruction for the continuous playback preparation including
a command for instructing the another information processing apparatus to change from the sleep state to a playback state, wherein the playback function of contents is available in the playback state,
the continuous playback position,
an identifier for acquiring the content from the information providing apparatus, and
a command for allowing the content to pause at the continuous playback position,
wherein when the continuous playback preparation is instructed and there are a plurality of information processing apparatuses that are selectable as the another information processing apparatus a menu of the plurality of information processing apparatuses is generated, and when the continuous playback preparation is instructed and there is only one information processing apparatus that is selectable as the another information processing apparatus the one information processing apparatus is automatically selected as the another information processing apparatus;
in response to receiving the instruction and without input from a user, the computer automatically performs (i) setting an identifier for acquiring the content from the information providing apparatus based on the place of acquiring the content from the information providing apparatus included in the instruction, (ii) seeking a continuous playback position in the content based on the continuous playback position included in the instruction, and (iii) displaying a respective image frame of the plurality of image frames of the video content which exists at the continuous playback position in a paused manner on a display screen; and a control means for controlling the playback means to play back the content from the continuous playback position when continuous playback is instructed by a user.

12. An information processing system comprising:
an information providing apparatus;
a first information processing apparatus; and
a second information processing apparatus in a sleep state, in which power consumption is suppressed and a playback function of contents is unavailable,
wherein the information providing apparatus stores contents,
the first information processing apparatus includes:
  a first playback means for requesting the information providing apparatus to transmit a content when a content playback has been instructed by a user, receiving the content transmitted from the information providing apparatus in response to the request, and playing back the content, the content comprising video content having a plurality of image frames, and
  a first control means for, in response to receiving an instruction for continuous playback preparation, automatically transmitting an instruction for stopping playback of the content to the first playback means as well as transmitting an instruction for continuous playback preparation to the second information processing apparatus, the instruction for the continuous playback preparation causes the second information processing apparatus upon receipt thereof and without input from the user to automatically
    change from the sleep state to a playback state, wherein the playback function of contents is available in the playback state,
    seek a continuous playback position which is a position of the content where the playback has been stopped,
    set an identifier for acquiring the content from the information providing apparatus, and
    cause a respective image frame of the plurality of image frames of the video content which exists at the continuous playback position to be displayed in a paused manner on a display screen associated with the second information processing apparatus upon completion of the continuous playback preparation so as to provide an indication to the user of the completion of the continuous playback preparation,
    wherein when the continuous playback preparation is instructed and there are a plurality of information processing apparatuses that are selectable as the second information processing apparatus a menu of the plurality of information processing apparatuses is generated, and when the continuous playback preparation is instructed and there is only one information processing apparatus that is selectable as the second information processing apparatus the one information processing apparatus is automatically selected as the second information processing apparatus, and
the second information processing apparatus includes:
  a second playback means for, in response to receiving the instruction for the continuous playback preparation transmitted from the first information processing apparatus, automatically setting an identifier for acquiring the content from the information providing apparatus based on the place of acquiring the content from the information providing apparatus included in the instruction, automatically seeking a continuous playback position in the content based on the continuous playback position included in the instruction, and automatically displaying, on a display screen, a pause screen of the content at the continuous playback position; and
  a second control means for controlling the second playback means to play back the content from the continuous playback position when continuous playback is instructed by the user, wherein when the continuous playback preparation is instructed by the user, the user selects the second information processing apparatus from a plurality of information processing apparatus.

13. An information processing method implemented by an information processing system including an information providing apparatus, a first information processing apparatus having a first playback means and a first control means as well as a second information processing apparatus having a second playback means and a second control means, the second information processing apparatus being in a sleep state, in which power consumption is suppressed and a playback function of contents is unavailable, the method comprising the steps of:
  storing contents in the information providing apparatus;
  in the first information apparatus,
  requesting, by the first playback means, the information providing apparatus to transmit a content when a content playback has been instructed by a user;
  receiving and playing back, by the first playback means, the content transmitted from the information providing apparatus in response to the request;
  in which the content comprises video content having a plurality of image frames, and
  when continuous playback preparation is instructed by the user,
  automatically stopping playback of the content by the first playback means, and transmitting an instruction for the continuous playback preparation to the second information processing apparatus,
    the instruction for the continuous playback preparation causes the second information apparatus upon receipt thereof and without input from the user to automatically
    change from the sleep state to a playback state, wherein the playback function of contents is available in the playback state,
    seek a continuous playback position which is a position of the content where the playback has been stopped,
    set an identifier for acquiring the content from the information providing apparatus, and
    cause a respective image frame of the plurality of image frames of the video content which exists at the continuous playback position to be displayed in a paused manner on a display screen associated with the second information apparatus upon completion of the continuous playback preparation so as to provide an indication to the user of the completion of the continuous playback preparation,
    wherein when the continuous playback preparation is instructed and there are a plurality of information processing apparatuses that are selectable as the second information processing apparatus a menu of the plurality of information processing apparatuses is generated, and when the continuous playback preparation is instructed and there is only one information processing apparatus that is selectable as the second information processing apparatus the one information processing apparatus is automatically selected as the second information processing apparatus;

in the second information processing apparatus,
receive the instruction for the continuous playback preparation transmitted from the first information processing apparatus;
in response to receiving the instruction, automatically setting an identifier for acquiring the content from the information providing apparatus based on the place of acquiring the content from the information providing apparatus included in the instruction, automatically seeking a continuous playback position in the content based on the continuous playback position included in the instruction, and automatically displaying, on a display screen, a pause screen of the content at the continuous playback position; and
playing back the content from the continuous playback position by the second playback means when continuous playback is instructed by the user, wherein when the continuous playback preparation is instructed by the user, the user selects the second information processing apparatus from a plurality of information processing apparatus.

14. An information processing apparatus, comprising:
a playback unit, implemented by a processor, configured to request an information providing apparatus to transmit a content when a content playback has been instructed by a user, receive the content transmitted from the information providing apparatus in response to the request, and play back the content; and
a control unit, implemented by the processor, configured to, in response to receiving an instruction for continuous playback preparation, automatically transmit an instruction for stopping playback of the content to the playback unit as well as transmit an instruction for continuous playback preparation to another information processing apparatus in a sleep state, in which power consumption is suppressed and a playback function of contents is unavailable,
the content comprises video content having a plurality of image frames,
the instruction for the continuous playback preparation causes the another information processing apparatus upon receipt thereof and without input from the user to automatically
change from the sleep state to a playback state, wherein the playback function of contents is available in the playback state,
seek a continuous playback position which is a position of the content where the playback has been stopped,
set an identifier for acquiring the content from the information providing apparatus, and
cause a respective image frame of the plurality of image frames of the video content which exists at the continuous playback position to be displayed in a paused manner on a display screen associated with the another information processing apparatus upon completion of the continuous playback preparation so as to provide an indication to the user of the completion of the continuous playback preparation,
wherein when the continuous playback preparation is instructed and there are a plurality of information processing apparatuses that are selectable as the another information processing apparatus a menu of the plurality of information processing apparatuses is generated, and when the continuous playback preparation is instructed and there is only one information processing apparatus that is selectable as the another information processing apparatus the one information processing apparatus is automatically selected as the another information processing apparatus.

15. An information processing apparatus, comprising:
a playback unit, implemented by a processor, configured to:
receive an instruction for continuous playback preparation for playback of a content transmitted from an information providing apparatus to another information processing apparatus as an instruction source in a sleep state, in which power consumption is suppressed and a playback function of contents is unavailable,
the content comprises video content having a plurality of image frames,
the instruction for the continuous playback preparation including
a command for instructing the another information processing apparatus to change from the sleep state to a playback state, wherein the playback function of contents is available in the playback state,
the continuous playback position,
an identifier for acquiring the content from the information providing apparatus, and
a command for allowing the content to pause at the continuous playback position,
wherein when the continuous playback preparation is instructed and there are a plurality of information processing apparatuses that are selectable as the another information processing apparatus a menu of the plurality of information processing apparatuses is generated, and when the continuous playback preparation is instructed and there is only one information processing apparatus that is selectable as the another information processing apparatus the one information processing apparatus is automatically selected as the another information processing apparatus; and
in response to receiving the instruction and without input from a user, automatically (i) set an identifier for acquiring the content from the information providing apparatus based on the place of acquiring the content from the information providing apparatus included in the instruction, (ii) seek a continuous playback position in the content based on the continuous playback position included in the instruction, and (iii) display a respective image frame of the plurality of image frames of the video content which exists at the continuous playback position in a paused manner on a display screen; and
a control unit, implemented by the processor, configured to control the playback unit to play back the content from the continuous playback position when continuous playback is instructed by a user.

16. An information processing system, comprising:
an information providing apparatus;
a first information processing apparatus; and
a second information processing apparatus in a sleep state, in which power consumption is suppressed and a playback function of contents is unavailable,
wherein the information providing apparatus stores contents, the first information processing apparatus includes:
a first playback unit, implemented by a first processor, configured to request the information providing apparatus to transmit a content when a content playback has been instructed by a user, receive the content transmitted from the information providing apparatus in response to the request, and play back the content, the content comprising video content having a plurality of image frames, and
a first control unit, implemented by the first processor, configured to, in response to receiving an instruction for continuous playback preparation, automatically transmit an instruction for stopping playback of the content to the first playback unit as well as transmit an instruction for continuous playback preparation to the second information processing apparatus,
the instruction for the continuous playback preparation causes the second information processing apparatus upon receipt thereof and without input from the user to automatically
change from the sleep state to a playback state, wherein the playback function of contents is available in the playback state,
seek a continuous playback position which is a position of the content where the playback has been stopped,
set an identifier for acquiring the content from the information providing apparatus, and
cause a respective image frame of the plurality of image frames of the video content which exists at the continuous playback position to be displayed in a paused manner on a display screen associated with the another information processing apparatus upon completion of the continuous playback preparation so as to provide an indication to the user of the completion of the continuous playback preparation,
wherein when the continuous playback preparation is instructed and there are a plurality of information processing apparatuses that are selectable as the second information processing apparatus a menu of the plurality of information processing apparatuses is generated, and when the continuous playback preparation is instructed and there is only one information processing apparatus that is selectable as the second information processing apparatus the one information processing apparatus is automatically selected as the second information processing apparatus, and
the second information processing apparatus includes:
a second playback unit, implemented by a second processor, configured to, in response to receiving the instruction for the continuous playback preparation transmitted from the first information processing apparatus, automatically set an identifier for acquiring the content from the information providing apparatus based on the place of acquiring the content from the information providing apparatus included in the instruction, automatically seek a continuous playback position in the content based on the continuous playback position included in the instruction, and automatically display, on a display screen, a pause screen of the content at the continuous playback position; and
a second control unit, implemented by the second processor, configured to control the second playback unit to play back the content from the continuous playback position when continuous playback is instructed by the user, wherein when the continuous playback preparation is instructed by the user, the user selects the second information processing apparatus from a plurality of information processing apparatus.

17. A display apparatus, comprising:
a playback device that operates by requesting an apparatus to transmit a content when a content playback has been instructed by a user, receiving the content transmitted from the apparatus in response to the request, and playing back the content; and
a controller that operates in response to receiving an instruction for continuous playback preparation, automatically transmitting an instruction for stopping playback of the content to the playback device as well as transmitting an instruction for continuous playback preparation to another apparatus in a sleep state, in which power consumption is suppressed and a playback function of contents is unavailable,
wherein the content comprises video content having a plurality of image frames,
the instruction for the continuous playback preparation causes the another apparatus upon receipt thereof and without input from the user to automatically
change from the sleep state to a playback state, wherein the playback function of contents is available in the playback state,
seek a continuous playback position which is a position of the content where the playback has been stopped,
set an identifier for acquiring the content from the apparatus, and
cause a respective image frame of the plurality of image frames of the video content which exists at the continuous playback position to be displayed in a paused manner on a display screen associated with the another apparatus upon completion of the continuous playback preparation so as to provide an indication to the user of the completion of the continuous playback preparation,
wherein when the continuous playback preparation is instructed by the user and there are a plurality of apparatuses that are selectable as the another apparatus a menu of the plurality of apparatuses is generated, and when the continuous playback preparation is instructed by the user and there is only one apparatus that is selectable as the another apparatus the one apparatus is automatically selected as the apparatus.

18. The display apparatus according to claim 17,
wherein the controller transmits information indicating that the content is during continuous playback preparation and given information including the continuous playback position to the apparatus and registers these information therein when the continuous playback preparation is instructed by the user.

19. The display apparatus according to claim 17, wherein the controller transmits the instruction for continuous playback preparation to another plurality of apparatuses.

20. An information processing method implemented by an information processing apparatus including a playback device and a controller, the method comprising the steps of:
requesting, by the playback device, an information providing apparatus to transmit a content when a content playback has been instructed by a user;
receiving and playing back, by the playback device, the content transmitted from the information providing apparatus in response to the request; and when continuous playback preparation is instructed by the user, automatically stopping playback of the content by the playback device, and transmitting an instruction for the continuous playback preparation to another information processing apparatus in a sleep state, in which power consumption is suppressed and a playback function of contents is unavailable, the content comprises video content having a plurality of image frames, the instruction for the continuous playback preparation causes the another information processing apparatus upon receipt thereof and without input from the user to automatically change from the sleep state to a playback state, wherein the playback function of contents is available in the playback state, seek a continuous playback position which is a position of the content where the playback has been stopped, set an identifier for acquiring the content from the information providing apparatus, and cause a respective image frame of the plurality of image frames of the video content which exists at the continuous playback position to be displayed in a paused manner on a display screen associated with the another information processing apparatus upon completion of the continuous playback preparation so as to provide an indication to the user of the completion of the continuous playback preparation, wherein when the continuous playback preparation is instructed by the user and there are a plurality of information processing apparatuses that are selectable as the another information processing apparatus a menu of the plurality of information processing apparatuses is generated, and when the continuous playback preparation is instructed by the user and there is only one information processing apparatus that is selectable as the another information processing apparatus the one information processing apparatus is automatically selected as the another information processing apparatus.

21. A non-transitory computer-readable medium storing computer program that, when executed, causes a computer to execute a process for processing information, the computer program allowing the computer to function as:

a playback device that operates to request an information providing apparatus to transmit a content when a content playback has been instructed by a user, receiving the content transmitted from the information providing apparatus in response to the request, and playing back the content; and a controller that operates for, in response to receiving an instruction for continuous playback preparation, automatically transmitting an instruction for stopping playback of the content to the playback device as well as transmitting an instruction for continuous playback preparation to another information processing apparatus in a sleep state, in which power consumption is suppressed and a playback function of contents is unavailable, the content comprises video content having a plurality of image frames, the instruction for the continuous playback preparation causes the another information processing apparatus upon receipt thereof and without input from the user to automatically change from the sleep state to a playback state, wherein the playback function of contents is available in the playback state, seek a continuous playback position which is a playback stop position of the content when the continuous playback preparation is instructed by the user, set an identifier for acquiring the content from the information providing apparatus, and cause a respective image frame of the plurality of image frames of the video content which exists at the continuous playback position to be displayed in a paused manner on a display screen associated with the another information processing apparatus upon completion of the continuous playback preparation so as to provide an indication to the user of the completion of the continuous playback preparation, wherein when the continuous playback preparation is instructed and there are a plurality of information processing apparatuses that are selectable as the another information processing apparatus a menu of the plurality of information processing apparatuses is generated, and when the continuous playback preparation is instructed and there is only one information processing apparatus that is selectable as the another information processing apparatus the one information processing apparatus is automatically selected as the another information processing apparatus.

22. An information processing apparatus, comprising:

a playback device that operates by:

receiving an instruction for continuous playback preparation for playback of a content transmitted from an information providing apparatus to another information processing apparatus as an instruction source in a sleep state, in which power consumption is suppressed and a playback function of contents is unavailable, wherein the content comprises video content having a plurality of image frames, the instruction for the continuous playback preparation including a command for instructing the another information processing apparatus to change from the sleep state to a playback state, wherein the playback function of contents is available in the playback state, the continuous playback position, an identifier for acquiring the content from the information providing apparatus, and a command for allowing the content to pause at the continuous playback position, wherein when the continuous playback preparation is instructed and there are a plurality of information processing apparatuses that are selectable as the another information processing apparatus a menu of the plurality of information processing apparatuses is generated, and when the continuous playback preparation is instructed and there is only one information processing apparatus that is selectable as the another information processing apparatus the one information processing apparatus is automatically selected as the another information processing apparatus;

in response to receiving the instruction and without input from a user, the information processing apparatus automatically performs (i) setting an identifier for acquiring the content from the information providing apparatus based on the place of acquiring the content from the information providing apparatus included in the instruction, (ii) seeking a continuous playback position in the content based on the continuous playback position included in the instruction, and (iii) displaying a respective image frame of the plurality of image frames of the video content which exists at the continuous playback position in a paused manner on a display screen; and a controller for controlling the playback device to play back the content from the continuous playback position when continuous playback is instructed by a user.

23. The information processing apparatus according to claim 22,
wherein the instruction for continuous playback preparation is transmitted also to other information processing apparatus other than the instruction source, and
the controller requests other information processing apparatus other than the instruction source to change from a playback state thereof into a sleep state when continuous playback is instructed by the user.

24. The information processing apparatus according to claim 22,
wherein the controller acquires the content during continuous playback preparation and the continuous playback position from the playback device when continuous playback is instructed by the user and controls the playback device to play back the content from the continuous playback position based on the position.

25. The information processing apparatus according to claim 22,
wherein information indicating that the content is during continuous playback preparation and given information including the continuous playback position are registered in the information providing apparatus, and
the controller acquires the given information registered in the information providing apparatus when continuous playback is instructed by the user and controls the playback device to play back the content from the continuous playback position based on the information.

26. An information processing method implemented by an information processing apparatus including a playback device and a controller, the method comprising the steps of:
receiving an instruction for continuous playback preparation for playback a content transmitted from an information providing apparatus to another information processing apparatus as an instruction source in a sleep state, in which power consumption is suppressed and a playback function of contents is unavailable,
the content comprises video content having a plurality of image frames,
the instruction for the continuous playback preparation including
a command for instructing the another information processing apparatus to change from the sleep state to a playback state, wherein the playback function of contents is available in the playback state,
the continuous playback position,
an identifier for acquiring the content from the information providing apparatus, and
a command for allowing the content to pause at the continuous playback position,
wherein when the continuous playback preparation is instructed and there are a plurality of information processing apparatuses that are selectable as the another information processing apparatus a menu of the plurality of information processing apparatuses is generated, and when the continuous playback preparation is instructed and there is only one information processing apparatus that is selectable as the another information processing apparatus the one information processing apparatus is automatically selected as the another information processing apparatus;
in response to receiving the instruction and without input from a user, automatically performing (i) setting an identifier for acquiring the content from the information providing apparatus based on the place of acquiring the content from the information providing apparatus included in the instruction, (ii) seeking a continuous playback position in the content based on the continuous playback position included in the instruction, and (iii) displaying a respective image frame of the plurality of image frames of the video content which exists at the continuous playback position in a paused manner on a display screen; and
playing back the content from the continuous playback position by the playback device when continuous playback is instructed by the user.

27. A non-transitory computer-readable medium storing computer program that, when executed, causes a computer to execute a process for processing information, the computer program allowing the computer to function as:
a playback device that operates by:
receiving an instruction for continuous playback preparation for playback a content transmitted from an information providing apparatus to another information processing apparatus as an instruction source in a sleep state, in which power consumption is suppressed and a playback function of contents is unavailable,
the content comprises video content having a plurality of image frames,
the instruction for the continuous playback preparation including
a command for instructing the another information processing apparatus to change from the sleep state to a playback state, wherein the playback function of contents is available in the playback state,
the continuous playback position,
an identifier for acquiring the content from the information providing apparatus, and
a command for allowing the content to pause at the continuous playback position,
wherein when the continuous playback preparation is instructed and there are a plurality of information processing apparatuses that are selectable as the another information processing apparatus a menu of the plurality of information processing apparatuses is generated, and when the continuous playback preparation is instructed and there is only one information processing apparatus that is selectable as the another information processing apparatus the one information processing apparatus is automatically selected as the another information processing apparatus;
in response to receiving the instruction and without input from a user, the computer automatically performs (i) setting an identifier for acquiring the content from the information providing apparatus based on the place of acquiring the content from the information providing apparatus included in the instruction, (ii) seeking a continuous playback position in the content based on the continuous playback position included in the instruction, and (iii) displaying a respective image frame of the plurality of image frames of the video content which exists at the continuous playback position in a paused manner on a display screen; and
a controller for controlling the playback device to play back the content from the continuous playback position when continuous playback is instructed by a user.

28. An information processing system comprising:
an information providing apparatus;
a first information processing apparatus; and
a second information processing apparatus in a sleep state, in which power consumption is suppressed and a playback function of contents is unavailable,
wherein the information providing apparatus stores contents,
the first information processing apparatus includes:
  a first playback device that requests the information providing apparatus to transmit a content when a content playback has been instructed by a user, receiving the content transmitted from the information providing apparatus in response to the request, and playing back the content, the content comprising video content having a plurality of image frames,; and
  a first controller that operates for, in response to receiving an instruction for continuous playback preparation, automatically transmitting an instruction for stopping playback of the content to the first playback device as well as transmitting an instruction for continuous playback preparation to the second information processing apparatus, the instruction for the continuous playback preparation causes the second information processing apparatus upon receipt thereof and without input from the user to automatically
    change from the sleep state to a playback state, wherein the playback function of contents is available in the playback state,
    seek a continuous playback position which is a position of the content where the playback has been stopped,
    set an identifier for acquiring the content from the information providing apparatus, and
    cause a respective image frame of the plurality of image frames of the video content which exists at the continuous playback position to be displayed in a paused manner on a display screen associated with the second information processing apparatus upon completion of the continuous playback preparation so as to provide an indication to the user of the completion of the continuous playback preparation,
    wherein when the continuous playback preparation is instructed and there are a plurality of information processing apparatuses that are selectable as the second information processing apparatus a menu of the plurality of information processing apparatuses is generated, and when the continuous playback preparation is instructed and there is only one information processing apparatus that is selectable as the second information processing apparatus the one information processing apparatus is automatically selected as the second information processing apparatus, and
the second information processing apparatus includes:
  a second playback device that operates, in response to receiving the instruction for the continuous playback preparation transmitted from the first information processing apparatus, automatically setting an identifier for acquiring the content from the information providing apparatus based on the place of acquiring the content from the information providing apparatus included in the instruction, automatically seeking a continuous playback position in the content based on the continuous playback position included in the instruction, and automatically displaying, on a display screen, a pause screen of the content at the continuous playback position; and
  a second controller that operates for controlling the second playback device to play back the content from the continuous playback position when continuous playback is instructed by the user, wherein when the continuous playback preparation is instructed by the user, the user selects the second information processing apparatus from a plurality of information processing apparatus.

29. An information processing method implemented by an information processing system including an information providing apparatus, a first information processing apparatus having a first playback device and a first controller as well as a second information processing apparatus having a second playback device and a second controller, the second information processing apparatus being in a sleep state, in which power consumption is suppressed and a playback function of contents is unavailable, the method comprising the steps of:
  storing contents in the information providing apparatus;
  in the first information apparatus,
  requesting, by the first playback device, the information providing apparatus to transmit a content when a content playback has been instructed by a user;
  receiving and playing back, by the first playback device, the content transmitted from the information providing apparatus in response to the request;
  in which the content comprises video content having a plurality of image frames, and
  when continuous playback preparation is instructed by the user,
  automatically stopping playback of the content by the first playback device, and transmitting an instruction for the continuous playback preparation to the second information processing apparatus,
    the instruction for the continuous playback preparation causes the second information apparatus upon receipt thereof and without input from the user to automatically
    change from the sleep state to a playback state, wherein the playback function of contents is available in the playback state,
    seek a continuous playback position which is a position of the content where the playback has been stopped,
    set an identifier for acquiring the content from the information providing apparatus, and
    cause a respective image frame of the plurality of image frames of the video content which exists at the continuous playback position to be displayed in a paused manner on a display screen associated with the second information apparatus upon completion of the continuous playback preparation so as to provide an indication to the user of the completion of the continuous playback preparation,
    wherein when the continuous playback preparation is instructed and there are a plurality of information processing apparatuses that are selectable as the second information processing apparatus a menu of the plurality of information processing apparatuses is generated, and when the continuous playback preparation is instructed and there is only one information processing apparatus that is selectable as the second information processing apparatus the one information processing apparatus is automatically selected as the second information processing apparatus;

in the second information processing apparatus,
receiving the instruction for the continuous playback preparation transmitted from the first information processing apparatus;

in response to receiving the instruction, automatically setting an identifier for acquiring the content from the information providing apparatus based on the place of acquiring the content from the information providing apparatus included in the instruction, automatically seeking a continuous playback position in the content based on the continuous playback position included in the instruction, and automatically displaying, on a display screen, a pause screen of the content at the continuous playback position; and playing back the content from the continuous playback position by the second playback device when continuous playback is instructed by the user, wherein when the continuous playback preparation is instructed by the user, the user selects the second information processing apparatus from a plurality of information processing apparatus.

\* \* \* \* \*